US012084119B2

(12) United States Patent
Patnaik et al.

(10) Patent No.: US 12,084,119 B2
(45) Date of Patent: *Sep. 10, 2024

(54) EFFICIENT AUTONOMOUS TRUCKS

(71) Applicant: WAYMO LLC, Mountain View, CA (US)

(72) Inventors: Vijaysai Patnaik, San Francisco, CA (US); William Grossman, East Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/474,610

(22) Filed: Sep. 26, 2023

(65) Prior Publication Data
US 2024/0025491 A1 Jan. 25, 2024

Related U.S. Application Data

(60) Continuation of application No. 17/098,535, filed on Nov. 16, 2020, now Pat. No. 11,801,905, which is a
(Continued)

(51) Int. Cl.
*B62D 35/00* (2006.01)
*B60W 30/18* (2012.01)
(Continued)

(52) U.S. Cl.
CPC ..... *B62D 35/001* (2013.01); *B60W 30/18009* (2013.01); *B60W 30/18109* (2013.01);
(Continued)

(58) Field of Classification Search
CPC .......... B62D 35/001; B60W 30/18009; B60W 30/18109; G01S 17/89; G05D 1/0238;
(Continued)

(56) References Cited

U.S. PATENT DOCUMENTS 3,145,954 A    8/1964  Jenny et al.
3,689,695 A    9/1972  Rosenfield et al.
(Continued)

FOREIGN PATENT DOCUMENTS

CN    101073018 A    11/2007
CN    106536315 A    3/2017
(Continued)

OTHER PUBLICATIONS

Firoz Alam & Simon Watkins, Implication of Vehicle Aerodynamics on Fuel Savings and the Environment, International Conference on Mechanical, Industrial and Materials Engineering 2013 (ICMIME2013), Nov. 1, 2013, p. 50-59, Paper ID: KL-07, Rajshahi, Bangladesh.
(Continued)

*Primary Examiner* — Nay Tun
(74) *Attorney, Agent, or Firm* — Botos Churchill IP Law

(57) ABSTRACT

The technology relates to enhancing the operation of autonomous vehicles. Extendible sensors are deployed based on detected or predicted conditions around a vehicle while operating in a self-driving mode. When not needed, the sensors are fully retracted into the vehicle to reduce drag and increase fuel economy. When the onboard system determines that there is a need for a deployable sensor, such as to enhance the field of view of the perception system, the sensor is extended in a predetermined manner. The deployment may depend on one or more operating conditions and/or particular driving scenarios. These and other sensors of the vehicle may be protected with a rugged housing, for instance to protect against damage from the elements. And in other situations, deployable foils may extend from the vehicle's chassis to increase drag and enhance braking. This may be helpful for large trucks in steep descent situations.

20 Claims, 28 Drawing Sheets

Related U.S. Application Data division of application No. 16/562,539, filed on Sep. 6, 2019, now Pat. No. 11,242,098.

(60) Provisional application No. 62/879,193, filed on Jul. 26, 2019.

(51) Int. Cl.
 *G01S 17/89* (2020.01)
 *G05D 1/00* (2006.01)
 *B60R 11/00* (2006.01)

(52) U.S. Cl.
 CPC ............ *G01S 17/89* (2013.01); *G05D 1/0238* (2013.01); *B60R 2011/0082* (2013.01); *B60R 2011/0094* (2013.01); *B60R 2300/8093* (2013.01)

(58) Field of Classification Search
 CPC ..... B60R 2011/0082; B60R 2011/0094; B60R 2300/8093
 See application file for complete search history.

(56) References Cited

U.S. PATENT DOCUMENTS

| | | | |
|---|---|---|---|
| 4,236,745 A | 12/1980 | Davis | |
| 4,458,937 A | 7/1984 | Beckmann et al. | |
| 4,671,564 A | 6/1987 | Sumida et al. | |
| 4,684,164 A | 8/1987 | Durham | |
| 4,693,506 A | 9/1987 | Massengill | |
| 4,810,022 A | 3/1989 | Takagi et al. | |
| 4,815,757 A | 3/1989 | Hamilton | |
| 4,824,165 A | 4/1989 | Fry | |
| 4,904,015 A | 2/1990 | Haines | |
| 5,156,195 A | 10/1992 | Wehler et al. | |
| 5,222,438 A | 6/1993 | Ende | |
| 5,317,880 A | 6/1994 | Spears | |
| 5,374,098 A | 12/1994 | Nelson | |
| 5,522,637 A | 6/1996 | Spears | |
| 5,902,345 A | 5/1999 | Minowa et al. | |
| 6,215,518 B1 | 4/2001 | Watkins | |
| 6,804,607 B1 | 10/2004 | Wood | |
| 7,134,985 B2 | 11/2006 | Watanabe et al. | |
| 8,123,419 B2 | 2/2012 | Cirker | |
| 8,794,690 B1 | 8/2014 | Al-Saeed | |
| 9,079,479 B2 | 7/2015 | Chen et al. | |
| 9,288,452 B2 | 3/2016 | Enomoto | |
| 9,336,436 B1 | 5/2016 | Dowdall | |
| 9,581,997 B1 | 2/2017 | Penilla et al. | |
| 9,731,771 B2 | 8/2017 | Sakabe et al. | |
| 9,896,032 B2 * | 2/2018 | Dudar .................. B60R 1/062 |
| 9,971,356 B2 | 5/2018 | Smith et al. | |
| 10,011,230 B1 | 7/2018 | Brown et al. | |
| 10,124,731 B2 | 11/2018 | Dudar | |
| 10,295,382 B2 | 5/2019 | Williams et al. | |
| 10,450,013 B2 | 10/2019 | Cha et al. | |
| 10,668,793 B2 | 6/2020 | Frederick et al. | |
| 10,726,567 B2 | 7/2020 | Lee et al. | |
| 11,420,570 B2 | 8/2022 | Shaharabani et al. | |
| 11,470,265 B2 | 10/2022 | Li et al. | |
| 2002/0048173 A1 | 4/2002 | Schmucker | |
| 2004/0119319 A1 | 6/2004 | Reiman et al. | |
| 2006/0081343 A1 | 4/2006 | Clark et al. | |
| 2006/0119141 A1 | 6/2006 | Queveau et al. | |
| 2007/0132272 A1 | 6/2007 | Adams et al. | |
| 2007/0132275 A1 | 6/2007 | Weaver | |
| 2007/0205938 A1 | 9/2007 | Zimmermann et al. | |
| 2009/0080878 A1 | 3/2009 | Cirker | |
| 2009/0184539 A1 | 7/2009 | Pursley | |
| 2010/0052361 A1 | 3/2010 | Tortosa-Boonacker | |
| 2010/0063736 A1 | 3/2010 | Hoetzer | |
| 2010/0194143 A1 | 8/2010 | Perkins et al. | |
| 2010/0209096 A1 | 8/2010 | Buschmann | |
| 2010/0220192 A1 | 9/2010 | Cirker | |
| 2011/0181725 A1 | 7/2011 | Matsuura et al. | |
| 2012/0022759 A1 | 1/2012 | Inoue et al. | |
| 2013/0076064 A1 | 3/2013 | Smith et al. | |
| 2014/0035315 A1 | 2/2014 | Otterstrom | |
| 2014/0136414 A1 | 5/2014 | Abhyanker | |
| 2014/0218530 A1 | 8/2014 | Sinclair | |
| 2015/0039218 A1 | 2/2015 | Bowers et al. | |
| 2015/0145995 A1 | 5/2015 | Shahraray et al. | |
| 2015/0165975 A1 | 6/2015 | Meadows | |
| 2015/0172520 A1 | 6/2015 | Lindman et al. | |
| 2015/0253536 A1 | 9/2015 | Le et al. | |
| 2015/0329111 A1 | 11/2015 | Prokhorov | |
| 2015/0360619 A1 | 12/2015 | Barthel et al. | |
| 2016/0236725 A1 | 8/2016 | Shirai | |
| 2016/0243988 A1 | 8/2016 | Peterson et al. | |
| 2016/0291134 A1 | 10/2016 | Droz et al. | |
| 2017/0050590 A1 | 2/2017 | List et al. | |
| 2017/0115387 A1 | 4/2017 | Luders et al. | |
| 2017/0168146 A1 | 6/2017 | Boehmke | |
| 2017/0356769 A1 | 12/2017 | Williams et al. | |
| 2017/0369106 A1 | 12/2017 | Williams | |
| 2018/0029597 A1 | 2/2018 | Gage et al. | |
| 2018/0039273 A1 | 2/2018 | Delp et al. | |
| 2018/0072313 A1 | 3/2018 | Stenneth | |
| 2018/0089611 A1 | 3/2018 | Burch et al. | |
| 2018/0148107 A1 | 5/2018 | Burrows et al. | |
| 2018/0265019 A1 | 9/2018 | Dry et al. | |
| 2018/0272963 A1 * | 9/2018 | Meyhofer .......... B60W 50/023 |
| 2018/0284573 A1 | 10/2018 | Cammenga et al. | |
| 2019/0210436 A1 * | 7/2019 | Frederick ................ B60J 7/043 |
| 2019/0375357 A1 | 12/2019 | Mezaael | |
| 2020/0056909 A1 | 2/2020 | Datta Gupta et al. | |
| 2020/0139942 A1 | 5/2020 | Berne | |
| 2020/0164875 A1 | 5/2020 | Öberg et al. | |
| 2020/0165985 A1 | 5/2020 | Jin | |
| 2020/0175867 A1 | 6/2020 | Chun et al. | |
| 2020/0307454 A1 | 10/2020 | Winberg et al. | |
| 2020/0317184 A1 | 10/2020 | Ali Khan et al. | |
| 2020/0331496 A1 | 10/2020 | Cao et al. | |
| 2020/0377120 A1 | 12/2020 | Thörn et al. | |
| 2020/0398765 A1 | 12/2020 | Krishnan et al. | |
| 2021/0017979 A1 | 1/2021 | Iannotti et al. | |

FOREIGN PATENT DOCUMENTS

| | | |
|---|---|---|
| CN | 108621969 A | 10/2018 |
| JP | H058706 A | 1/1993 |
| JP | 2014051260 A | 3/2014 |
| WO | 0246000 A1 | 6/2002 |
| WO | 2017177205 A1 | 10/2017 |
| WO | 2018175808 A1 | 9/2018 |

OTHER PUBLICATIONS

International Search Report and Written Opinion for PCT/US20/43259 dated Nov. 17, 2020.

The First Office Action for Chinese Patent Application No. 202010708358.5, Oct. 11, 2023, 26 Pages.

* cited by examiner

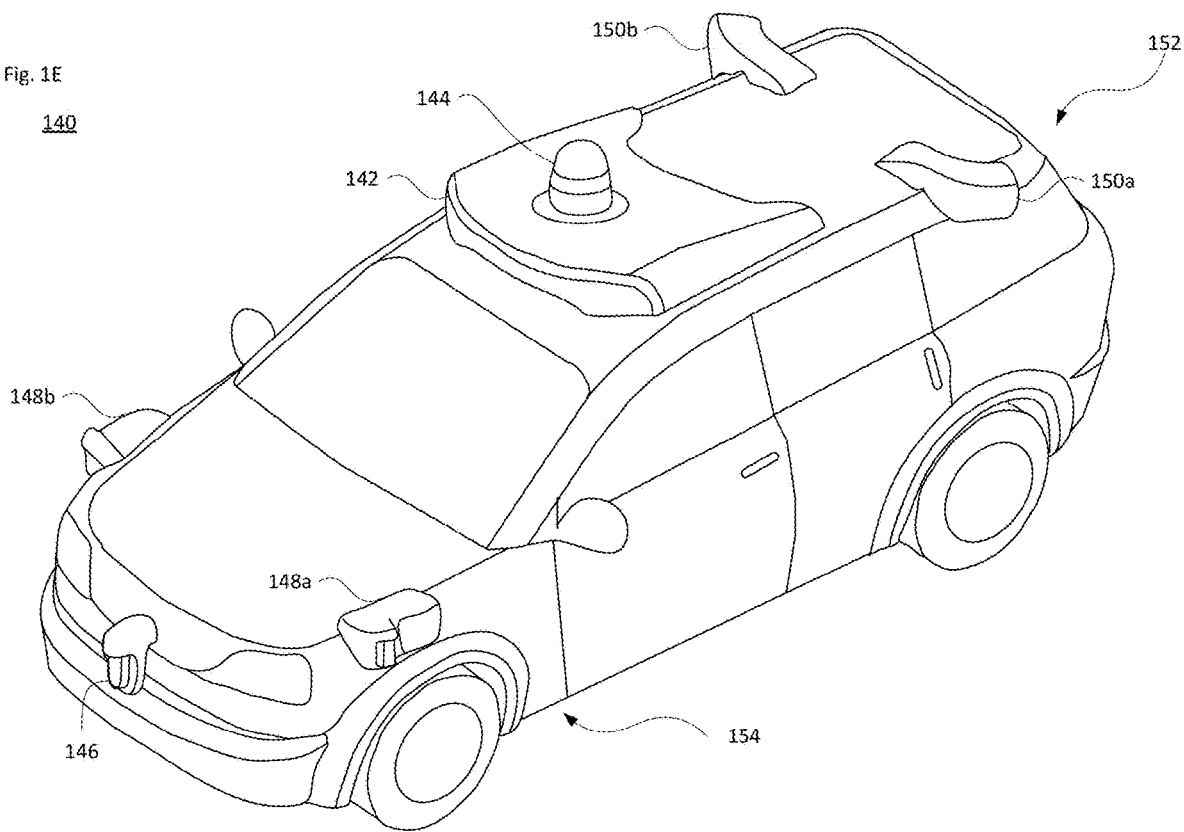

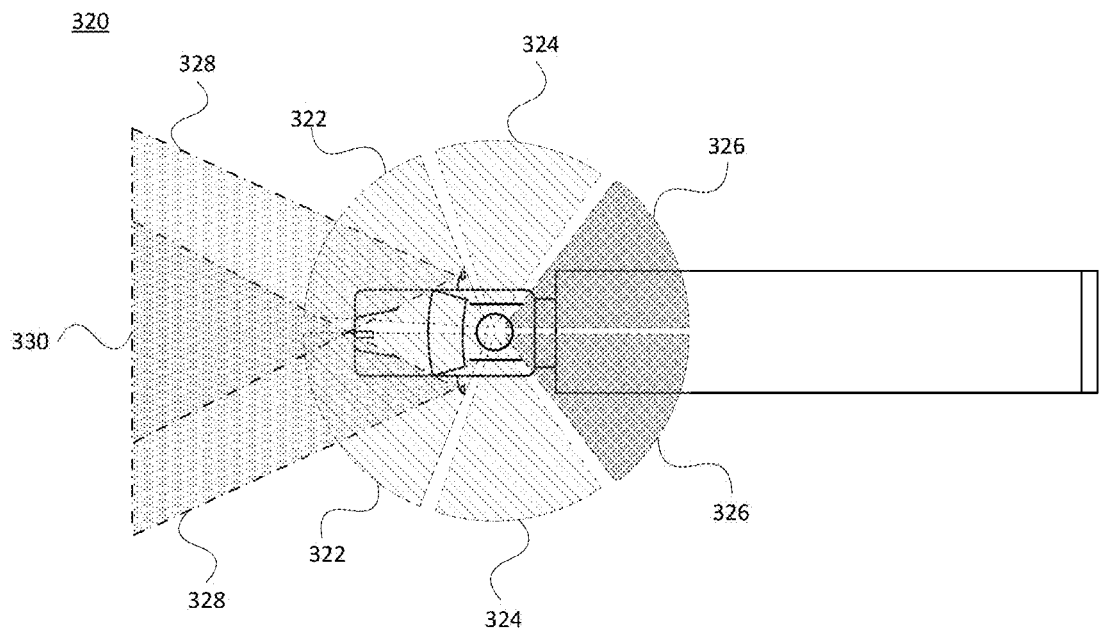

400

410

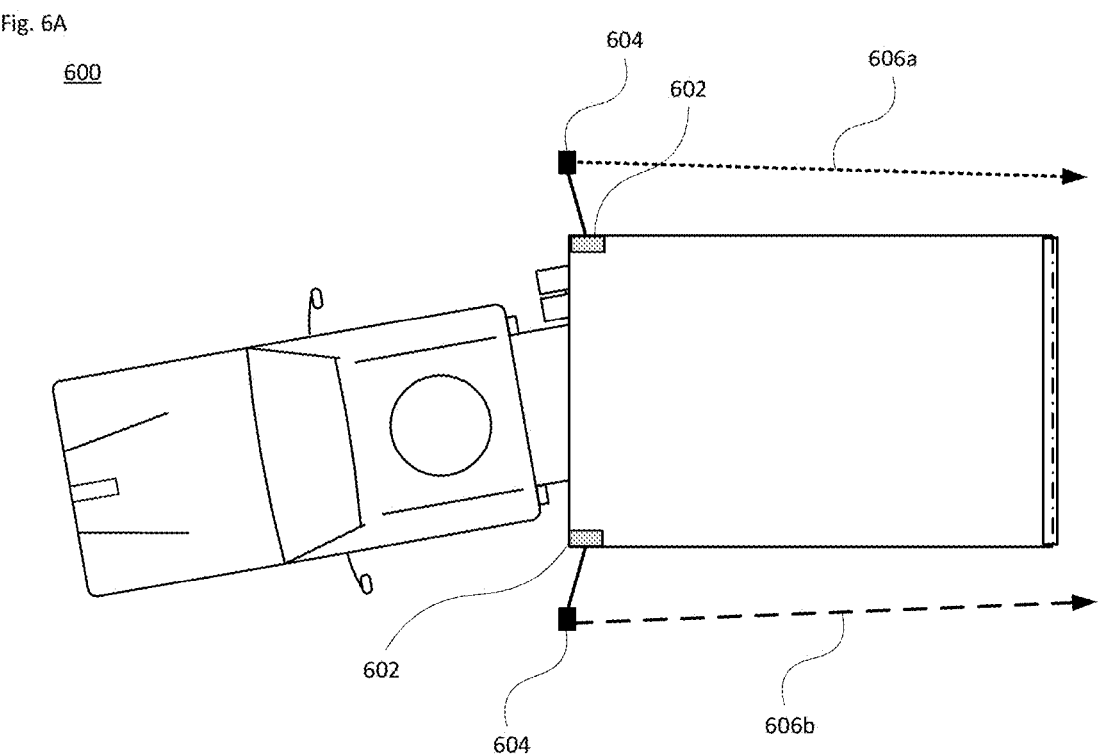

700

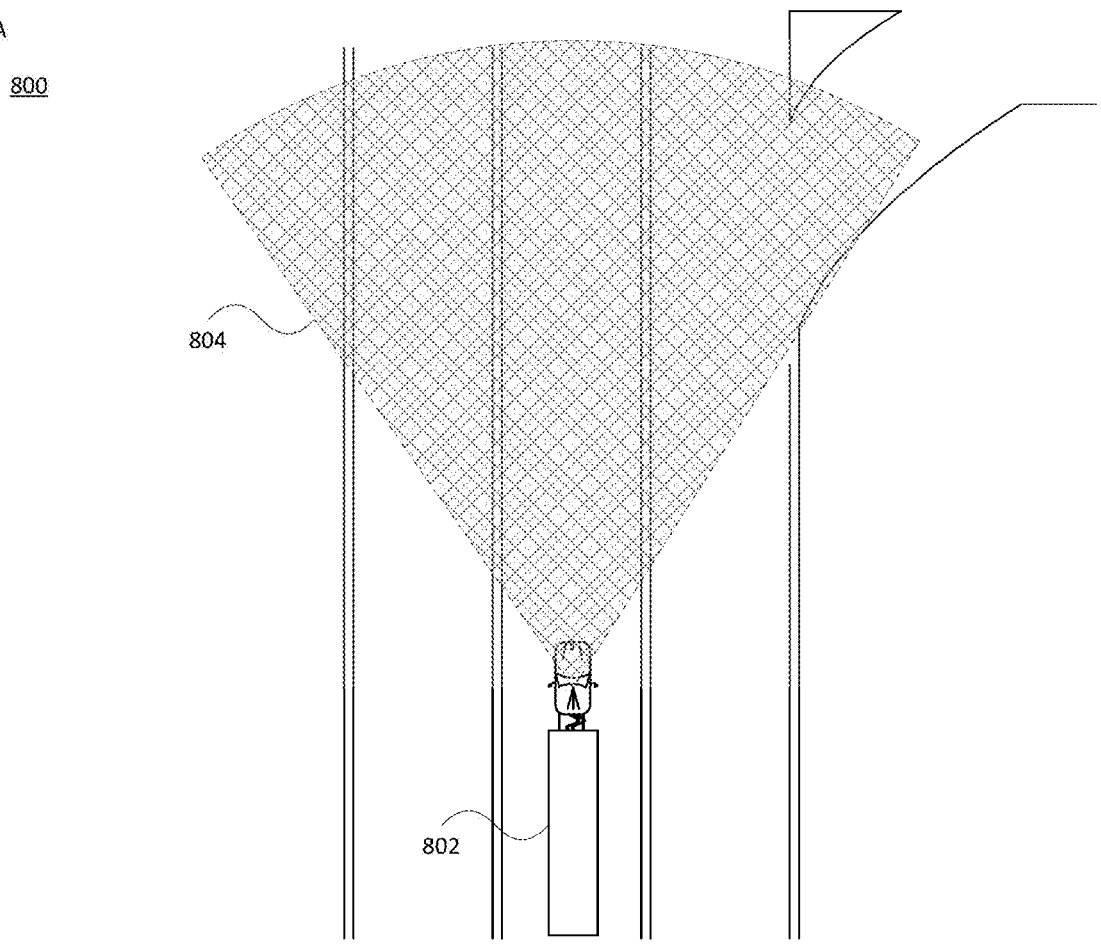

810

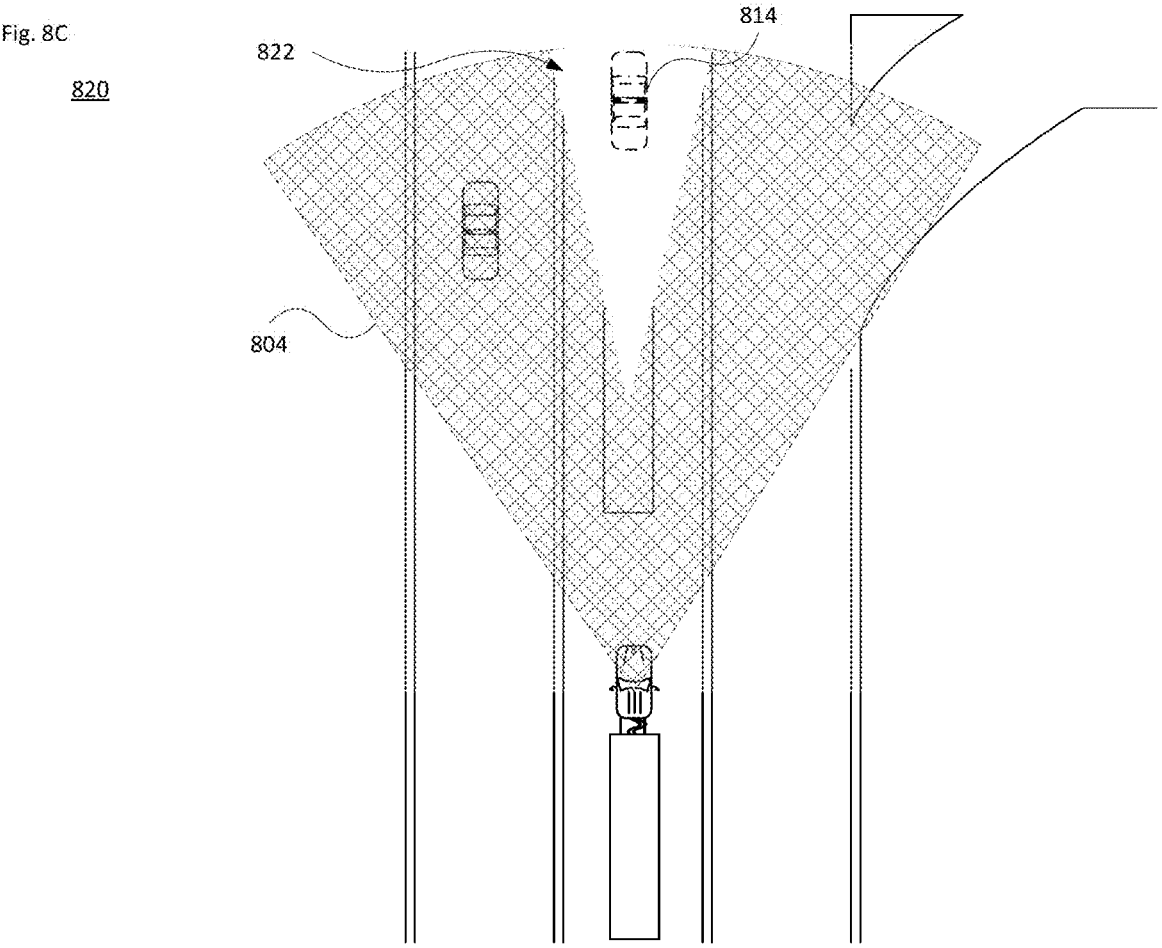

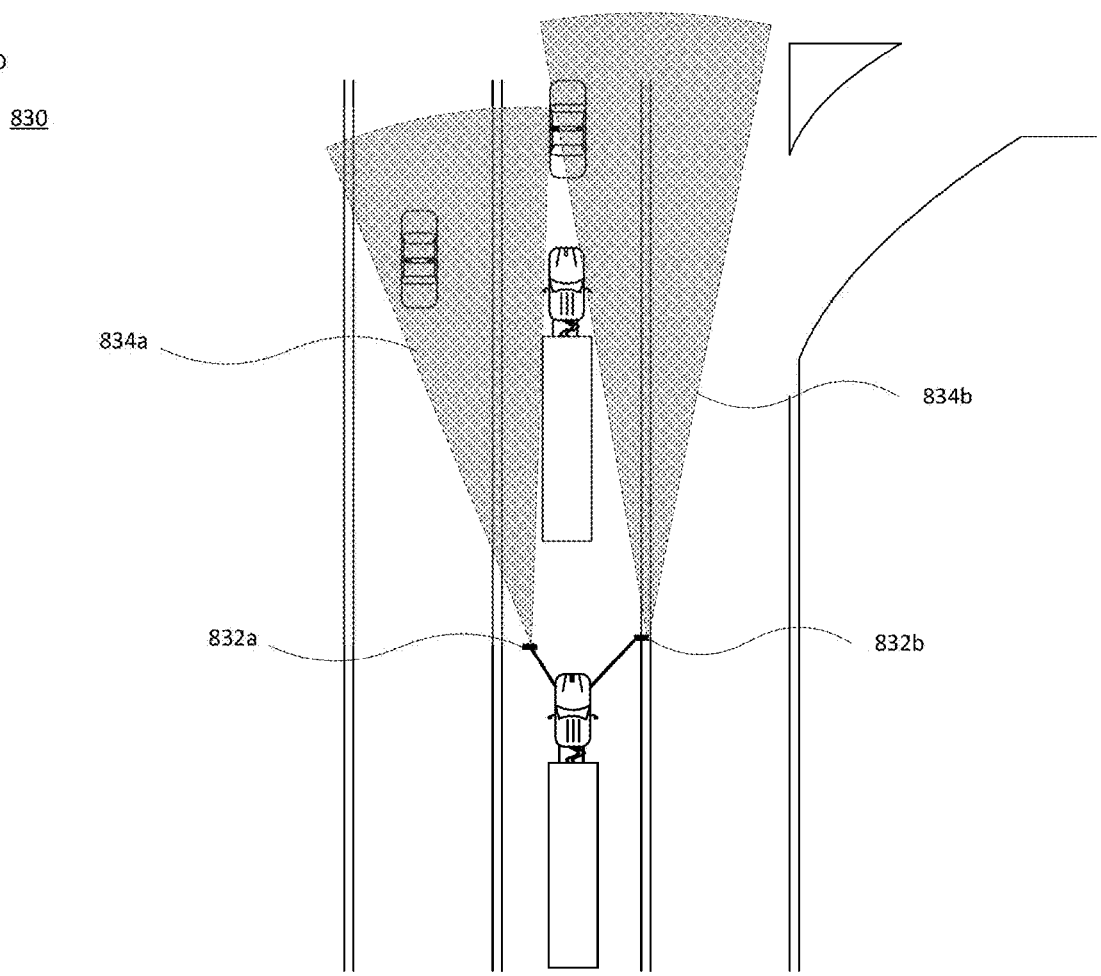

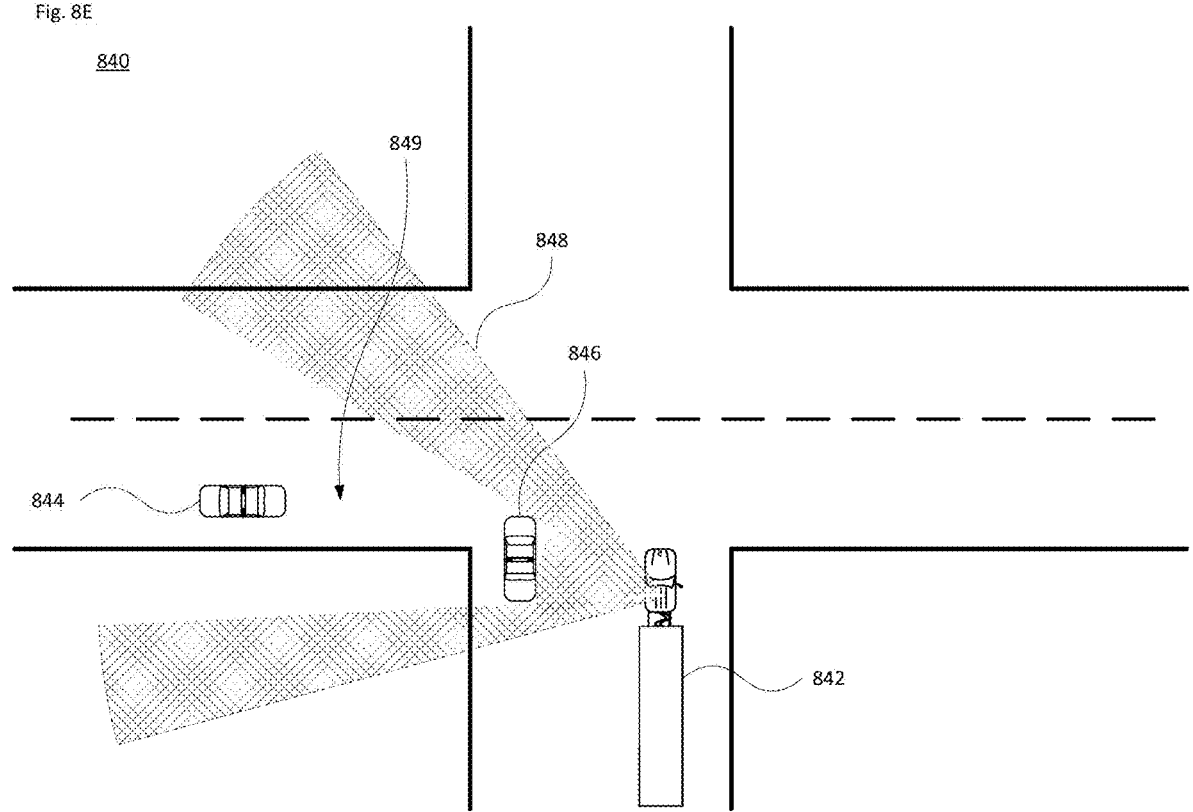

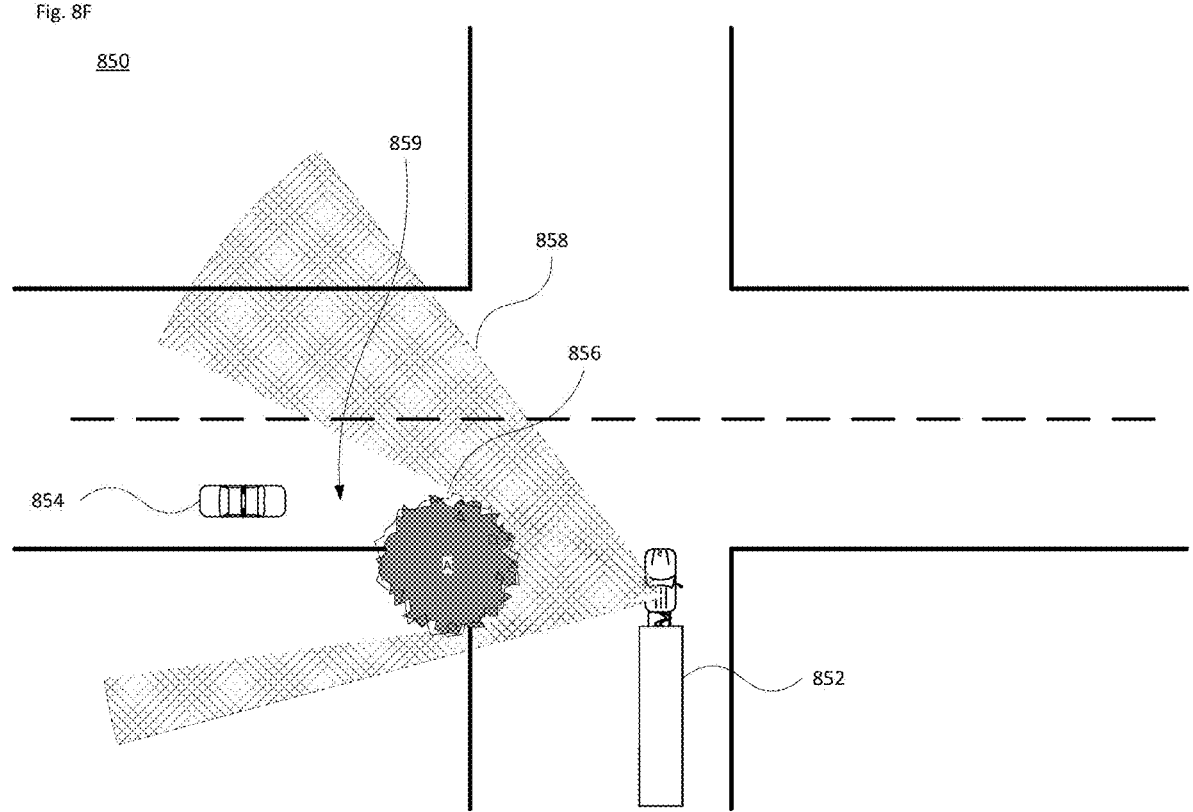

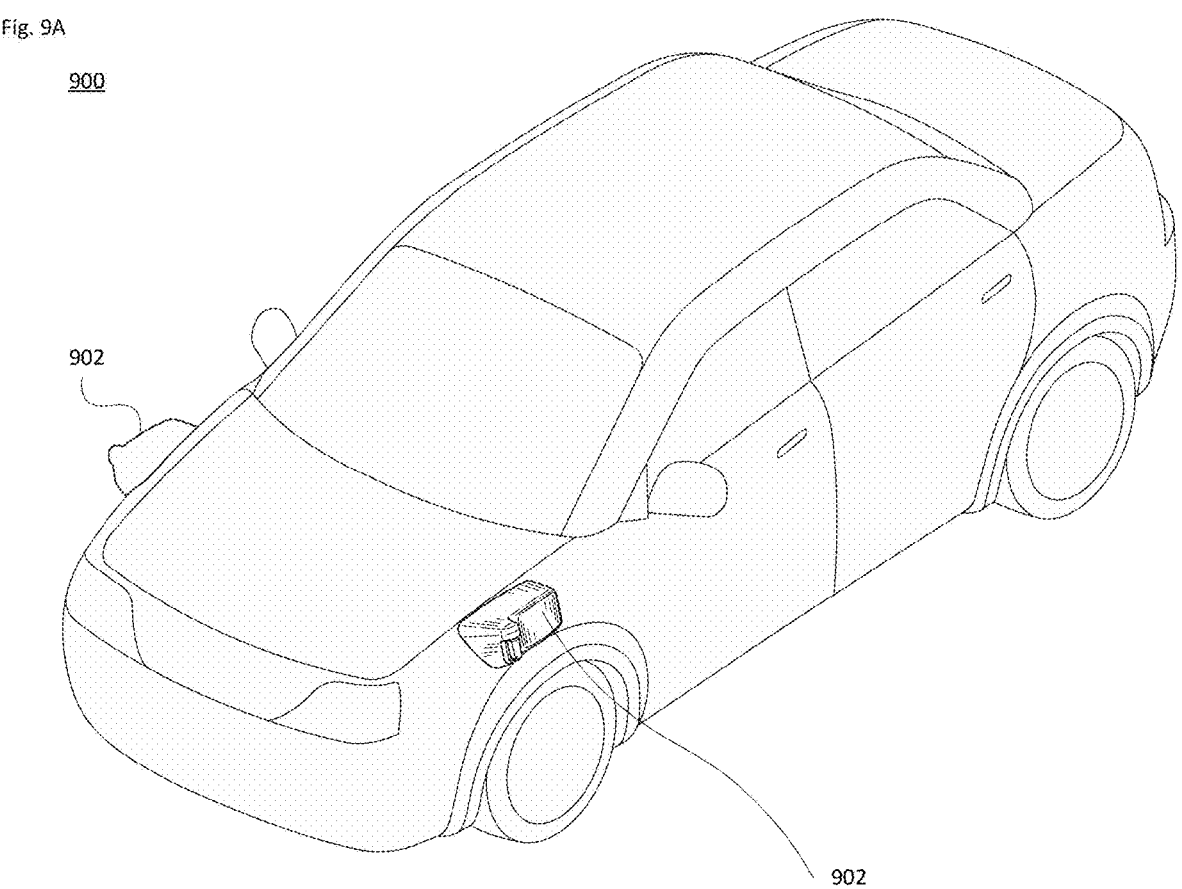

910
912
912

1000

1010

EFFICIENT AUTONOMOUS TRUCKS

CROSS-REFERENCE TO RELATED APPLICATIONS

The present application is a continuation of U.S. patent application Ser. No. 17/098,535, filed Nov. 16, 2020, which is a divisional of U.S. application Ser. No. 16/562,539, filed Sep. 6, 2019, now U.S. Pat. No. 11,242,098, which claims the benefit of the filing date of U.S. Provisional Patent Application No. 62/879,193, filed Jul. 26, 2019, the entire disclosures of which are incorporated herein by reference.

BACKGROUND

Autonomous vehicles, such as vehicles that do not require a human driver, can be used to aid in the transport of trailered (e.g., towed) cargo, such as freight, livestock or other items from one location to another. Other types of articulated vehicles may also transport cargo or passengers. Such vehicles may operate in a fully autonomous mode without any in-vehicle passenger input or a partially autonomous mode where a person may provide some driving input. One or more sensors can be used to detect nearby objects in the environment, and the vehicle may use information from the sensors when driving in an autonomous mode. However, the size and placement of such sensors may be less than optimal, resulting in increased drag, lower fuel efficiency, and possible blind spots around the vehicle.

BRIEF SUMMARY

The technology involves optimal shapes and configurations regarding sensors for autonomous vehicles, such as to provide increased fuel economy, efficient aerodynamic profiles, and enhanced sensor results in certain operating conditions.

According to one aspect of the technology, a vehicle is configured to operate in an autonomous driving mode. The vehicle comprises a driving system, a perception system and a control system. The driving system includes a steering subsystem, an acceleration subsystem and a deceleration subsystem to control driving of the vehicle in the autonomous driving mode. The perception system is configured to detect objects in an environment external to the vehicle. The perception system includes one or more sensors. The control system includes one or more processors. The control system is operatively coupled to the driving system and the perception system. The control system is configured, while the vehicle is operating in the autonomous driving mode, to determine, based on information obtained by the perception system, a likelihood that there is an object in the external environment that is within a predetermined distance of the vehicle. In response to a determination that the likelihood that the object is within the predetermined distance, the control system is configured to select one of the one or more sensors to be deployed in an active sensing mode. It is also configured to instruct the perception system to deploy the selected sensor from a retracted position within a housing of the vehicle to an extended position external to the housing.

In one example, the perception system is further configured to activate the selected sensor upon deployment to the extended position. In another example, upon receiving instruction to deploy the selected sensor, the perception system is further configured to cause a cover of the housing to be adjusted to expose the selected sensor prior to deployment. Here, the vehicle may further comprise the cover, wherein the cover is adjusted by retracting the cover into an interior portion of the housing.

In response to a determination that there is a likelihood that the object is within the predetermined distance (e.g., exceeding a threshold probability), the control system is further configured to evaluate an aerodynamic profile of the vehicle to determine impact of deployment of the selected sensor on the aerodynamic profile.

In another example, the extended position is selected according to a projected aerodynamic impact of deployment of the selected sensor.

In a further example, the control system is also configured to determine whether to retract the selected sensor. Here, upon a determination to retract the selected sensor, the control system instructs the perception system to retract the selected sensor to the retracted position. In this case, the determination of whether to retract the selected sensor may be based on one or more of detected objects in the external environment, a current weather condition, a projected weather condition, a current roadway configuration, or an upcoming roadway configuration.

In yet another example, the control system is further configured to control the driving system based on the information obtained by the selected sensor. And in a further example, the selected sensor is one of lidar, radar, an optical image sensor, an infrared image sensor, or an acoustical sensor.

According to another aspect of the technology, a vehicle is configured to operate in an autonomous driving mode. The vehicle comprises a driving system, a perception system and a control system. The driving system includes a steering subsystem, an acceleration subsystem and a deceleration subsystem to control driving of the vehicle in the autonomous driving mode. The perception system is configured to detect objects in an environment external to the vehicle, and the perception system includes one or more sensors. The control system includes one or more processors and is operatively coupled to the driving system and the perception system. The control system is configured, while the vehicle is operating in the autonomous driving mode, to determine at least one of an environmental condition and a stopped condition. In response to determination of the at least one of the environmental condition and the stopped condition, the control system is configured to cause a protective housing to cover a given sensor of the perception system. The protective housing is arranged to cover at least one externally facing surface of the given sensor.

In one example, the protective housing hermetically seals the given sensor from the external environment. In another example, the protective housing prevents access to the given sensor from the external environment. In a further example, the environmental condition is either a detected weather condition or a forecast weather condition. In yet another example, the environmental condition is a roadway quality. The environmental condition may be associated with a sensor vibration likelihood. And the stopped condition may include the vehicle being parked at a location for a predetermined length of time.

According to a further aspect of the technology, a cargo vehicle is configured to operate in an autonomous driving mode. The vehicle cargo comprises a driving system, a perception system and a control system. The driving system includes a steering subsystem, an acceleration subsystem and a deceleration subsystem to control driving of the vehicle in the autonomous driving mode. The perception system is configured to detect objects in an environment external to the vehicle, wherein the perception system including one or more sensors. The control system includes one or more processors and is operatively coupled to the driving system and the perception system. The control system is configured, while the cargo vehicle is operating in the autonomous driving mode, to determine, based on information received from at least one of the perception system and a mapping system, a downgrade for an upcoming portion of a roadway. It is also configured to determine a braking profile for the vehicle based on the downgrade, determine whether the downgrade exceeds one or more parameters of the braking profile, and, in response to determining that the downgrade exceeds the one or more parameters, cause the deceleration system to deploy a braking foil between at least a portion of the vehicle's chassis and the roadway.

In one example, the braking foil is deployable from the chassis of the vehicle's cab. In another example, the braking foil is deployable from the chassis of the vehicle's trailer.

BRIEF DESCRIPTION OF THE DRAWINGS

FIG. 1E illustrates an example passenger vehicle for use with aspects of the technology.

FIG. 3B is another example of sensor coverage for a vehicle in accordance with aspects of the disclosure.

FIGS. 6A-B illustrate a second extension example in accordance with aspects of the technology.

FIGS. 8A-D illustrate a deployment scenario in accordance with aspects of the disclosure.

FIGS. 8E-F illustrate other scenarios in accordance with aspects of the disclosure.

FIGS. 9A-B illustrate examples of covering and uncovering sensors in accordance with aspects of the disclosure.

DETAILED DESCRIPTION

Overview

The technology relates to fully autonomous or semi-autonomous vehicles, including cargo vehicles (e.g., tractor-trailers) and other articulated vehicles (e.g., buses), construction or farm vehicles, as well as passenger vehicles (e.g., sedans and minivans). On-board sensors, such as lidar sensors, radar sensors and cameras, are used to detect objects in the vehicle's environment. Such sensors or housings that include multiple sensors may project from one or more places along the vehicle. This can create drag and otherwise reduce fuel economy. In addition, the fixed placement of certain sensors may provide limited fields of view (FOV) and potential blind spots. Aspects of the technology provide adaptive sensor systems that deploy when needed. The deployment may depend on one or more operating conditions and/or particular driving scenarios. These aspects are discussed further below.

Figure 1A:
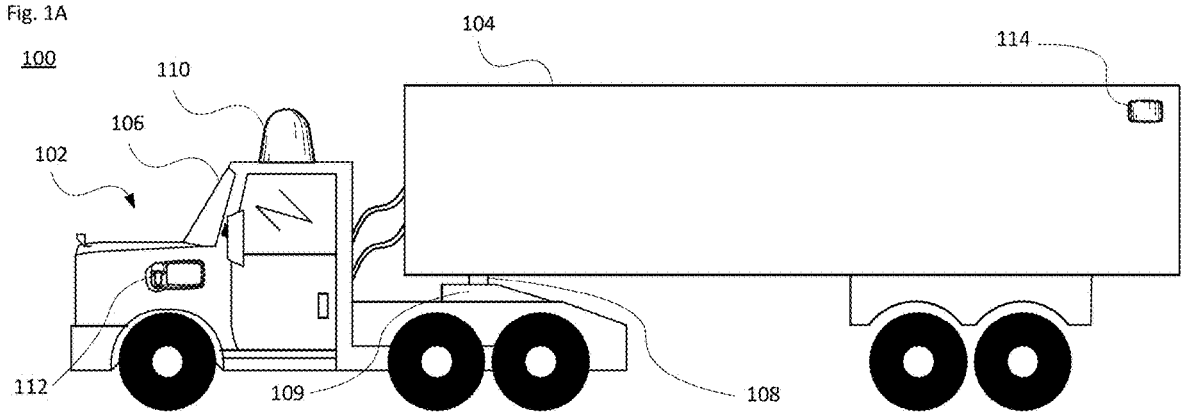
FIGS. 1A-B illustrate an example tractor-trailer arrangement for use with aspects of the technology.
Figure 1B:
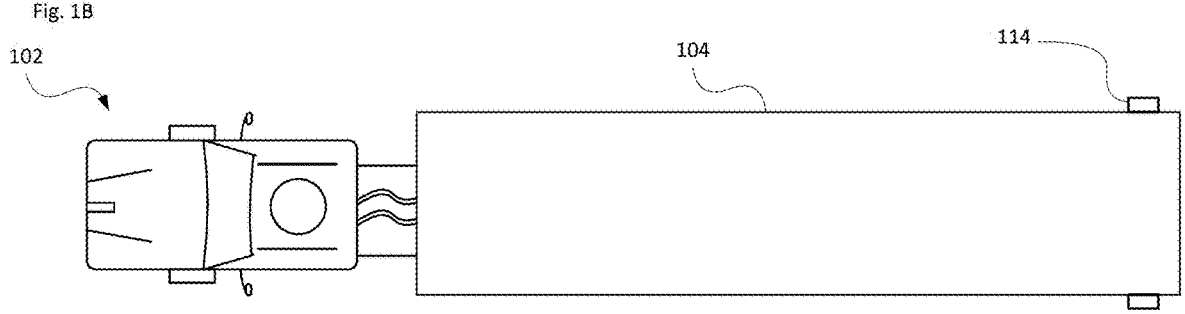

FIGS. 1A-B illustrate an example vehicle 100, such as a tractor-trailer truck, that can employ the technology discussed herein. The truck may include, e.g., a single, double or triple trailer, or may be another medium or heavy duty truck such as in commercial weight classes 4 through 8. As shown, the truck includes a tractor unit 102 and a single cargo unit or trailer 104. The trailer 104 may be fully enclosed, open such as a flat bed, or partially open depending on the type of cargo to be transported. The tractor unit 102 includes the engine and steering systems (not shown) and a cab 106 for a driver and any passengers. In a fully autonomous arrangement, the cab 106 may not be equipped with seats or manual driving components, since no person may be necessary.

The trailer 104 includes a hitching point, known as a kingpin, 108. The kingpin 108 is typically formed as a solid steel shaft, which is configured to pivotally attach to the tractor unit 102. In particular, the kingpin 108 attaches to a trailer coupling 109, known as a fifth-wheel, that is mounted rearward of the cab. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

Figure 1C:
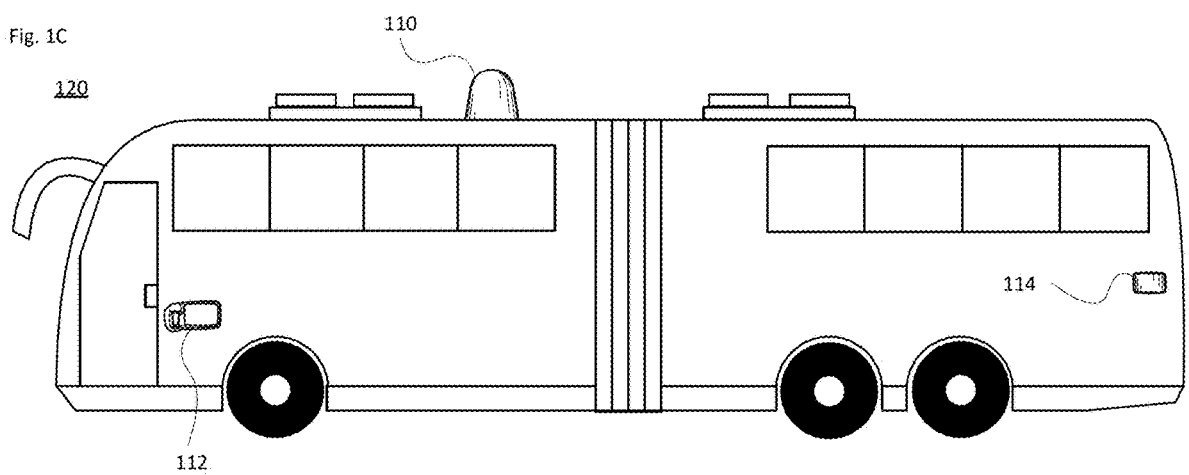
FIGS. 1C-D illustrate an example articulated bus arrangement for use with aspects of the technology.
Figure 1D:
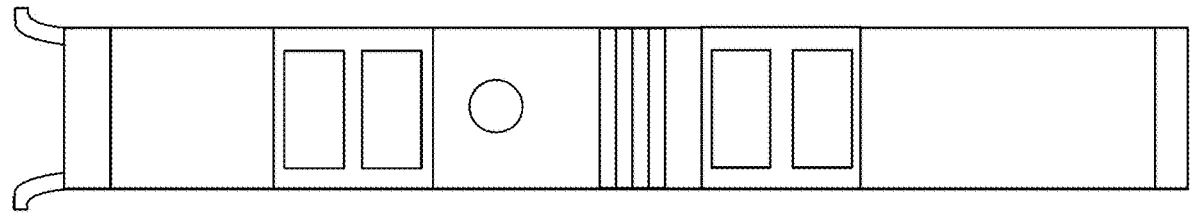

As shown, the tractor may have one or more sensor units 110, 112 disposed therealong. For instance, one or more sensor units 110 may be disposed on a roof or top portion of the cab 106, and one or more side sensor units 112 may be disposed on left and/or right sides of the cab 106. Sensor units may also be located along other regions of the cab 106, such as along the front bumper or hood area, in the rear of the cab, adjacent to the fifth-wheel, underneath the chassis, etc. The trailer 104 may also have one or more sensor units 114 disposed therealong, for instance along a side panel, front, rear, roof and/or undercarriage of the trailer 104. FIGS. 1C-D illustrate an example of another type of articulated vehicle 120, such as an articulated bus. As with the tractor-trailer 100, the articulated bus 120 may include one or more sensor units disposed along different areas of the vehicle.

FIG. 1E is a perspective view of an exemplary passenger vehicle 140 that can also employ the technology discussed herein. Similar to vehicles 100 and 120, the vehicle 140 includes various sensors for obtaining information about the vehicle's external environment. For instance, a roof-top housing 142 and sensor suite 144 may include a lidar sensor as well as various cameras and/or radar units. Housing 146, located at the front end of vehicle 140, and housings 148a, 148b on the driver's and passenger's sides of the vehicle may each store a lidar or other sensor. For example, each housing 148 may be located in front of the driver's side door. Vehicle 140 also includes housings 150a, 150b for radar units, lidar and/or cameras also located towards the rear roof portion of the vehicle. Additional lidar, radar units and/or cameras (not shown) may be located at other places along the vehicle 140. For instance, arrow 152 indicates that a sensor unit may be positioned along the read of the vehicle 140, such as on or adjacent to the bumper. And arrow 154 indicates that another sensor unit may be positioned on the undercarriage of the vehicle.

By way of example, as discussed further below each sensor unit may include one or more sensors within one housing, such as lidar, radar, camera (e.g., optical or infrared), acoustical (e.g., microphone or sonar-type sensor), inertial (e.g., accelerometer, gyroscope, etc.) or other sensors.

Example Systems

Figure 2A:
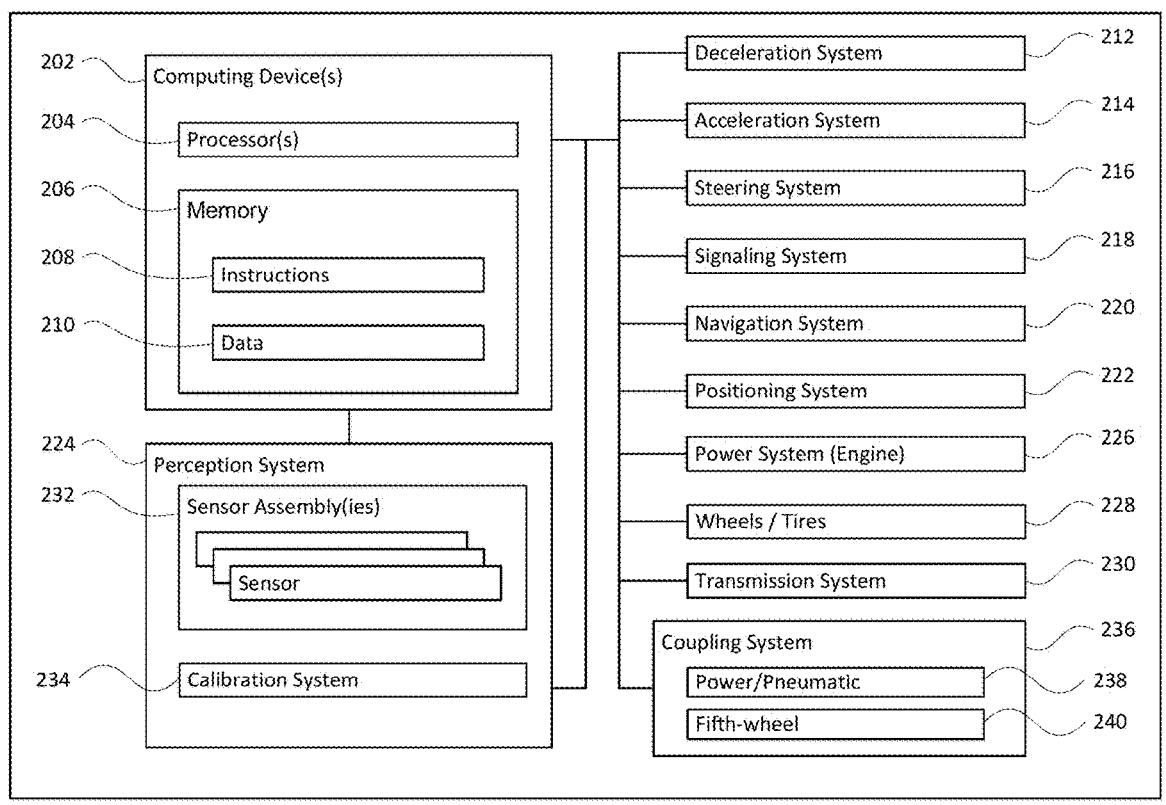
FIG. 2A illustrates a system diagram of an autonomous vehicle control system in accordance with aspects of the disclosure.

FIG. 2A illustrates a block diagram 200 with various components and systems of a vehicle, such as a truck, farm equipment or construction equipment, configured to operate in a fully or semi-autonomous mode of operation. By way of example, there are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as "autonomous" driving modes. Thus, reference to an autonomous driving mode includes both partial and full autonomy.

As shown in the block diagram of FIG. 2A, the vehicle includes a control system of one or more computing devices, such as computing devices 202 containing one or more processors 204, memory 206 and other components typically present in general purpose computing devices. The control system may constitute an electronic control unit (ECU) of a tractor unit. The memory 206 stores information accessible by the one or more processors 204, including instructions 208 and data 210 that may be executed or otherwise used by the processor 204. The memory 206 may be of any type capable of storing information accessible by the processor, including a computing device-readable medium. The memory is a non-transitory medium such as a hard drive, memory card, optical disk, solid state device, tape memory, or the like. Systems may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein.

The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. As an example, data 210 of memory 206 may store information, such as calibration information, to be used when calibrating different types of sensors, mirrors and other parts of a perception system.

The one or more processor 204 may be any conventional processors, such as commercially available CPUs. Alternatively, the one or more processors may be a dedicated device such as an ASIC or other hardware-based processor, FPGA or the like. Although FIG. 2A functionally illustrates the processor(s), memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may be capable of communicating with various components of the vehicle in order to perform route planning and driving operations. For example, the computing devices 202 may be in communication with various systems of the vehicle, such as a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle).

The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle by controlling various components. By way of example, computing devices 202 may navigate the vehicle to a destination location completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears (e.g., via the transmission system 230), and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other transmission system 230 that includes various components between an engine of the vehicle and the wheels of the vehicle. Again, by controlling these systems, computing devices 202 may also control the transmission system 230 of the vehicle in order to maneuver the vehicle autonomously.

As an example, computing devices 202 may interact with deceleration system 212 and acceleration system 214 in order to control the speed of the vehicle. Similarly, steering system 216 may be used by computing devices 202 in order to control the direction of vehicle. For example, if the vehicle is configured for use on a road, such as a tractor-trailer truck or a construction vehicle, the steering system 216 may include components to control the angle of the wheels of the tractor unit to turn the vehicle. Signaling system 218 may be used by computing devices 202 in order to signal the vehicle's intent to other drivers or vehicles, for example, by lighting turn signals or brake lights when needed.

Navigation system 220 may be used by computing devices 202 in order to determine and follow a route to a location. In this regard, the navigation system 220 and/or data 210 may store map information, e.g., highly detailed maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

The perception system 224 also includes one or more sensors or other components for detecting objects external to the vehicle such as other vehicles, obstacles in the roadway, traffic signals, signs, trees, etc. For example, the perception system 224 may include one or more light detection and ranging (lidar) sensors, acoustical (e.g., microphone or sonar) devices, radar units, cameras (e.g., optical and/or infrared), inertial sensors (e.g., gyroscopes or accelerometers), pressure sensors, and/or any other detection devices that record data which may be processed by computing devices 202. The sensors of the perception system 224 may detect objects and their characteristics such as location, orientation, size, shape, type (for instance, vehicle, pedestrian, bicyclist, vegetation, etc.), heading, and speed of movement, etc. The raw data from the sensors (e.g., lidar point clouds) and/or the aforementioned characteristics can be sent for further processing to the computing devices 202 periodically or continuously as it is generated by the perception system 224. Computing devices 202 may use information from the positioning system 222 to determine the vehicle's location and the perception system 224 to detect and respond to objects when needed to reach the location safely, including planning changes to the route and/or modifying driving operations.

As indicated in FIG. 2A, the perception system 224 includes one or more sensor assemblies 232. Each sensor assembly 232 may include one or more sensors at least partly received in a housing. In one example, the sensor assemblies 232 may be arranged as sensor towers integrated into the side-view mirrors on the truck, farm equipment, construction equipment, bus or the like. Sensor assemblies 232 may also be positioned at different locations on the tractor unit 102 or on the trailer 104, as noted above with regard to FIGS. 1A-B. The computing devices 202 may communicate with the sensor assemblies located on both the tractor unit 102 and the trailer 104. Each assembly may have one or more types of sensors such as those described above.

The autonomous driving computing system may perform calibration of individual sensors and their associated mirrors, all sensors in a particular sensor assembly relative to a commonly used mirror, between sensors in different sensor assemblies, between multiple mirrors in case of non-coplanar setups, etc. This may be done using a calibration system 234, which may be part of the perception system 224, the computing devices 202 or some other part of the autonomous driving computing system. In one example, the calibration system 234, perception system 224, computing devices 202 and other systems may be directly or indirectly connected via a Controller Area Network (CAN bus) of the vehicle.

Also shown in FIG. 2A is a coupling system 236 for connectivity between the tractor unit and the trailer. The coupling system 236 includes one or more power and/or pneumatic connections 238, and a fifth-wheel 240 at the tractor unit for connection to the kingpin at the trailer.

Figure 2B:
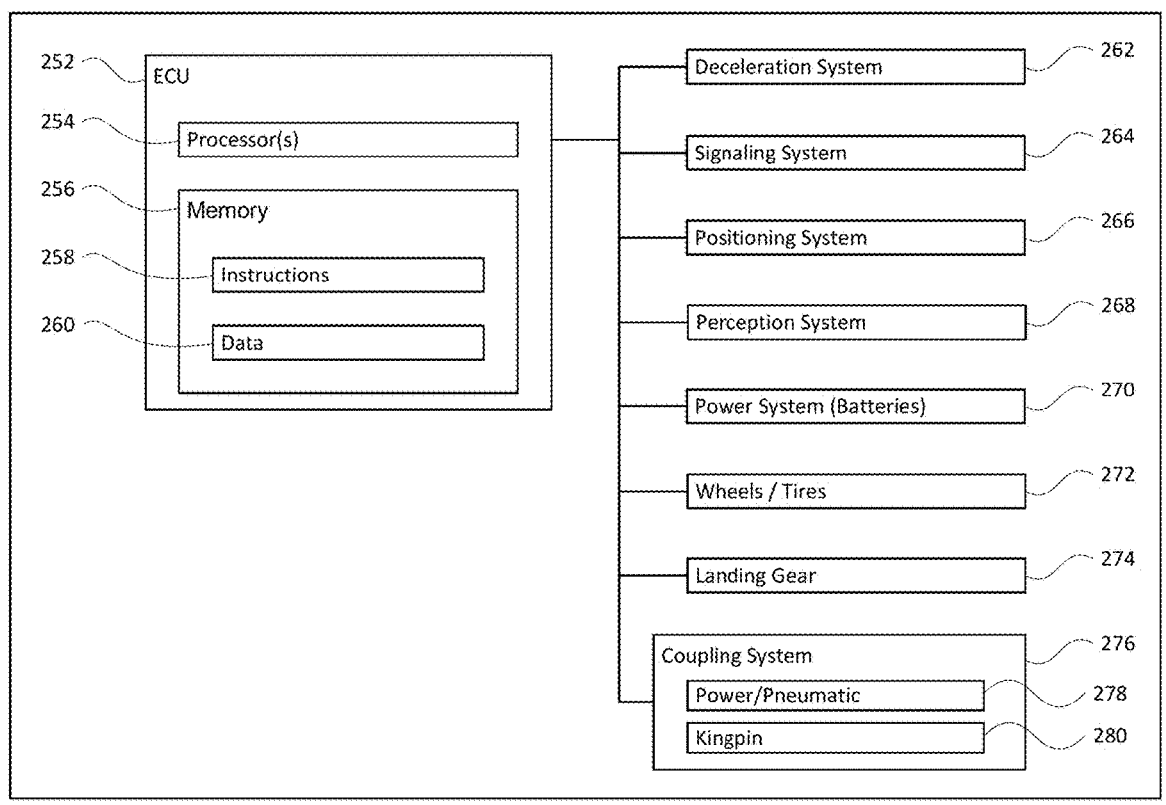
FIG. 2B illustrates a system diagram of a trailer, in accordance with aspects of the disclosure.

FIG. 2B illustrates an example block diagram 250 of a trailer. As shown, the system includes an ECU 252 of one or more computing devices, such as computing devices containing one or more processors 254, memory 256 and other components typically present in general purpose computing devices. The memory 256 stores information accessible by the one or more processors 254, including instructions 258 and data 260 that may be executed or otherwise used by the processor(s) 254. The descriptions of the processors, memory, instructions and data from FIG. 2A apply to these elements of FIG. 2B.

The ECU 252 is configured to receive information and control signals from the trailer unit. The on-board processors 254 of the ECU 252 may communicate with various systems of the trailer, including a deceleration system 262 (for controlling braking of the trailer), signaling system 264 (for controlling turn signals), and a positioning system 266 (to assist in determining the location of the trailer). The ECU 252 may also be operatively coupled to a perception system 268 with one or more sensors for detecting objects in the trailer's environment. One or more mirrors may be included as part of the perception system 268 or separate from the perception system. A power system 270 (for example, a battery power supply) provides power to local components on the trailer. Some or all of the wheels/tires 272 of the trailer may be coupled to the deceleration system 262, and the processors 254 may be able to receive information about tire pressure, balance, wheel speed and other factors that may impact driving in an autonomous mode, and to relay that information to the processing system of the tractor unit. The deceleration system 262, signaling system 264, positioning system 266, perception system 268, power system 270 and wheels/tires 272 may operate in a manner such as described above with regard to FIG. 2A. The trailer also includes a set of landing gear 274, as well as a coupling system 276. The landing gear provide a support structure for the trailer when decoupled from the tractor unit. The coupling system 276, which may be a part of coupling system 238, provides connectivity between the trailer and the tractor unit. The coupling system 276 may include a connection section 278 (e.g., for power and/or pneumatic links) to provide backward compatibility with legacy trailer units that may or may not be capable of operating in an autonomous mode. The coupling system also includes a kingpin 280 configured for connectivity with the fifth-wheel of the tractor unit.

While the components and systems of FIGS. 2A-B are described in relation to a tractor-trailer arrangement, as noted above the technology may be employed with other types of articulated vehicles, such as the articulate bus 120 of FIGS. 1C-D.

Figure 2C:
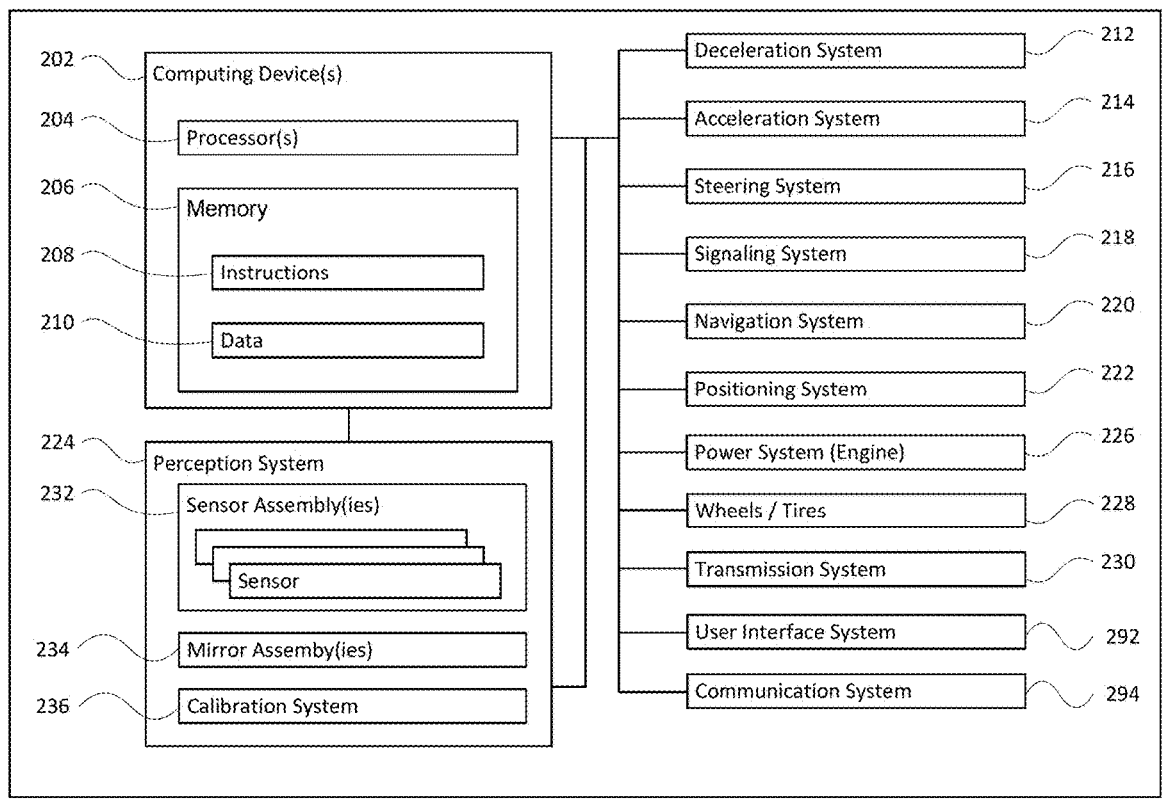
FIG. 2C illustrates a system diagram of another autonomous vehicle control system in accordance with aspects of the disclosure.

FIG. 2C illustrates a block diagram 290 with various components and systems of a passenger-type vehicle such as shown in FIG. 1E, configured to operate in a fully or semi-autonomous mode of operation. The passenger-type vehicle may be, e.g., a car, motorcycle, recreational vehicles, etc. The block diagram 290 shows that the passenger vehicle may have components and systems that are equivalent to what is shown and described in block diagram 200, for instance to form an autonomous driving computing system for controlling vehicle 140 of FIG. 1E.

A user interface system 292 may include, e.g., a mouse, keyboard, touch screen and/or microphone, as well as one or more displays (e.g., a touch screen display with or without haptic feedback, a heads-up display, or the like) that is operable to display information to passengers in the vehicle. In this regard, an internal electronic display may be located within a cabin of vehicle 140 (not shown) and may be used by computing devices 202 to provide information to the passengers.

Also shown in FIG. 2C is a communication system 294. The communication system 294 may include one or more wireless connections to facilitate communication with other computing devices, such as passenger computing devices within the vehicle, and computing devices external to the vehicle, such as in another nearby vehicle on the roadway or a remote server system. The wireless connections may include short range communication protocols such as Bluetooth™ or Bluetooth™ low energy (LE), cellular connections, etc. Various configurations and protocols may be employed, such as Ethernet, WiFi and HTTPS, for communication via the Internet, intranets, virtual private networks, wide area networks, local networks, private networks using communication protocols proprietary to one or more companies, and various combinations of the foregoing.

Example Implementations and Scenarios

In view of the structures and configurations described above and illustrated in the figures, various implementations will now be described.

Information obtained from one or more sensors is employed so that the vehicle may operate in an autonomous driving mode. Each sensor, or type of sensor, may have a different range, resolution and/or FOV.

For instance, the sensors may include a long range, narrow FOV lidar and a short range, tall FOV lidar. In one example, the long range lidar may have a range exceeding 50-250 meters, while the short range lidar has a range no greater than 1-50 meters. Alternatively, the short range lidar may generally cover up to 10-15 meters from the vehicle while the long range lidar may cover a range exceeding 100 meters. In another example, the long range is between 10-200 meters, while the short range has a range of 0-20 meters. In a further example, the long range exceeds 80 meters while the short range is below 50 meters. Intermediate ranges of between, e.g., 10-100 meters can be covered by one or both of the long range and short range lidars, or by a medium range lidar that may also be included in the sensor system. The medium range lidar may be disposed between the long and short range lidars in a single housing. In addition to or in place of these lidars, a set of cameras may be arranged, for instance to provide forward, side and rear-facing imagery. Similarly, a set of radar sensors may also be arranged to provide forward, side and rear-facing data. Other sensors may include an inertial sensor such as a gyroscope, an accelerometer, etc.

Figure 3A:
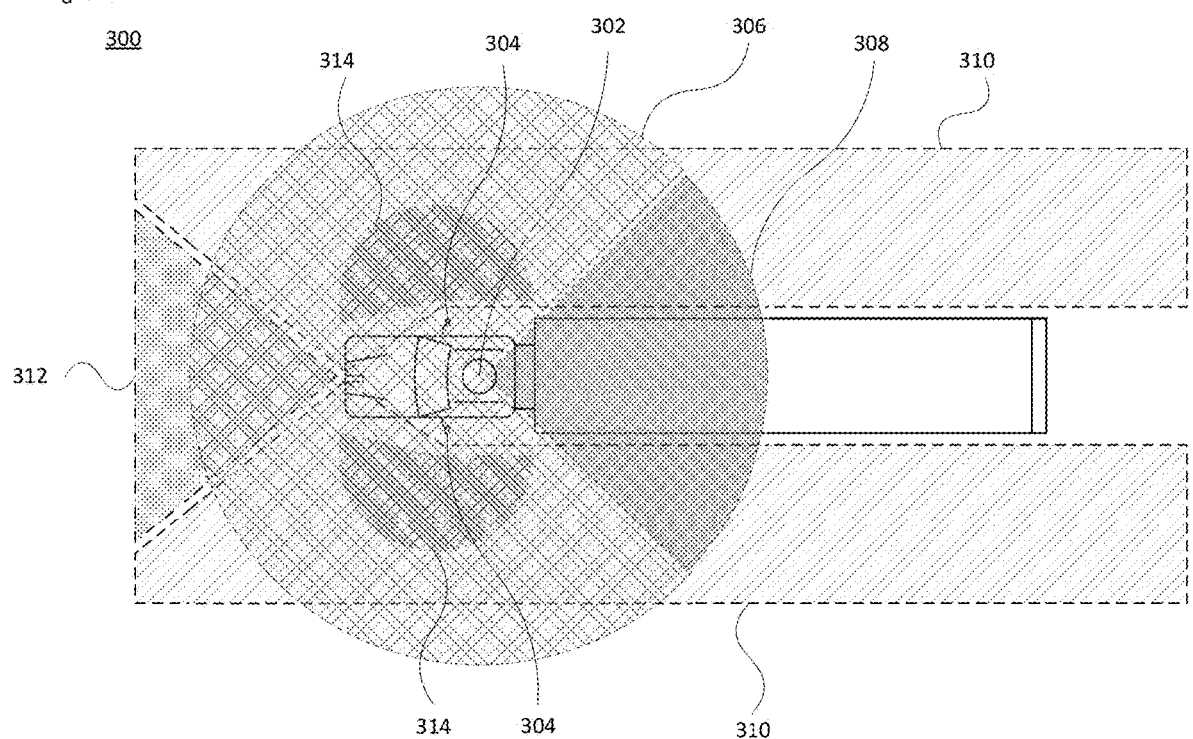
FIG. 3A is an example of sensor coverage for a vehicle in accordance with aspects of the disclosure.

Examples of lidar, camera and radar sensors and their fields of view are shown in FIGS. 3A and 3B. In example 300 of FIG. 3A, one or more lidar units may be located in rooftop sensor housing 302, with other lidar units in side sensor housings 304. In particular, the rooftop sensor housing 302 may be configured to provide a 360° FOV. A pair of sensor housings 304 may be located on either side of the tractor unit cab, for instance integrated into a side view mirror assembly, along a side door or quarterpanel of the cab, or extending out laterally along one or both sides of the cab roof. In one scenario, long range lidars may be located along a top or upper area of the sensor housings 302 and 304. The long range lidar may be configured to see over the hood of the vehicle. And short range lidars may be located in other portions of the sensor housings 302 and 304. The short range lidars may be used by the perception system to determine whether an object such as another vehicle, pedestrian, bicyclist, etc. is next to the front or side of the vehicle and take that information into account when determining how to drive or turn. Both types of lidars may be co-located in the housing, for instance aligned along a common vertical axis.

As illustrated in FIG. 3A by the dash-dot circle, the lidar(s) in the rooftop sensor housing 302 may have a FOV 306. Here, as shown by region 308, the trailer or other articulating portion of the vehicle may provide signal returns, and may partially or fully block a rearward view. Long range lidars on the left and right sides of the tractor unit have fields of view 310. These can encompass significant areas along the sides and front of the vehicle. As shown, there may be an overlap region 312 of their fields of view in front of the vehicle. The overlap region 312 provides the perception system with additional or information about a very important region that is directly in front of the tractor unit. This redundancy also has a safety aspect. Should one of the long range lidar sensors suffer degradation in performance, the redundancy would still allow for operation in an autonomous mode. Short range lidars on the left and right sides may have different (e.g., smaller) fields of view 314. A space is shown between different fields of view for clarity in the drawing; however in actuality there may be no break in the coverage. The specific placements of the sensor assemblies and fields of view is merely exemplary, and may different depending on, e.g., the type of vehicle, the size of the vehicle, FOV requirements, etc.

FIG. 3B illustrates an example configuration 320 for either (or both) of radar and camera sensors in a rooftop housing and on both sides of a tractor-trailer vehicle. Here, there may be multiple radar and/or camera sensors in each of the sensor housings 302 and 304. As shown, there may be sensors in the rooftop housing with front fields of view 322, side fields of view 324 and rear fields of view 326. As with region 308, the trailer may impact the ability of the sensor to detect objects behind the vehicle. Sensors in the sensor housings 304 may have forward facing fields of view 328 (and side and/or rear fields of view as well). As with the lidars discussed above with respect to FIG. 3A, the sensors of FIG. 3B may be arranged so that the adjoining fields of view overlap, such as shown by overlapping region 330. The overlap regions here similarly can provide redundancy and have the same benefits should one sensor suffer degradation in performance.

The different sensors described above can provide for robust operation in an autonomous driving mode. Ideally, sensors should be arranged to be as flush as possible with the vehicle body while still providing clear optical (or infrared, RF, e.g.,) pathways. However, this may not be feasible under conditions that require a certain sensor field of view FOV. Thus, according to one aspect, sensor units or housings containing one or more sensors may be integrated into a portion of the vehicle body/chassis when not needed, and extended from the vehicle when required for a given situation.

Figure 4A:
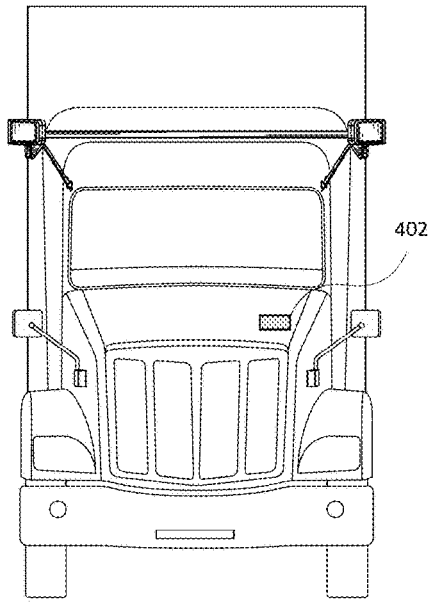
FIGS. 4A-B illustrate an example of extending a sensor from a vehicle in accordance with aspects of the disclosure.
Figure 4B:
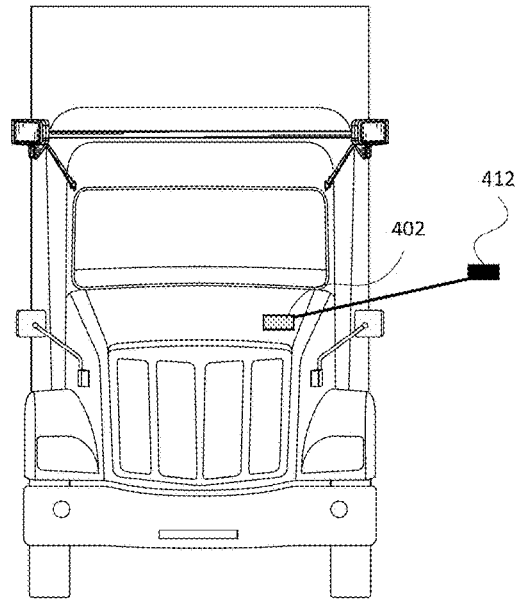

FIGS. 4A-B illustrate one example. As shown in view 400 of FIG. 4A, a portion of the vehicle body provides an aerodynamic cover 402 for a given sensor when that sensor is not in use. When needed, as shown in view 410 of FIG. 4B, sensor 412 extends from the portion of the vehicle body. When the sensor is not needed, it may then retract back into the vehicle and be protected by the cover 402.

Figure 5A:
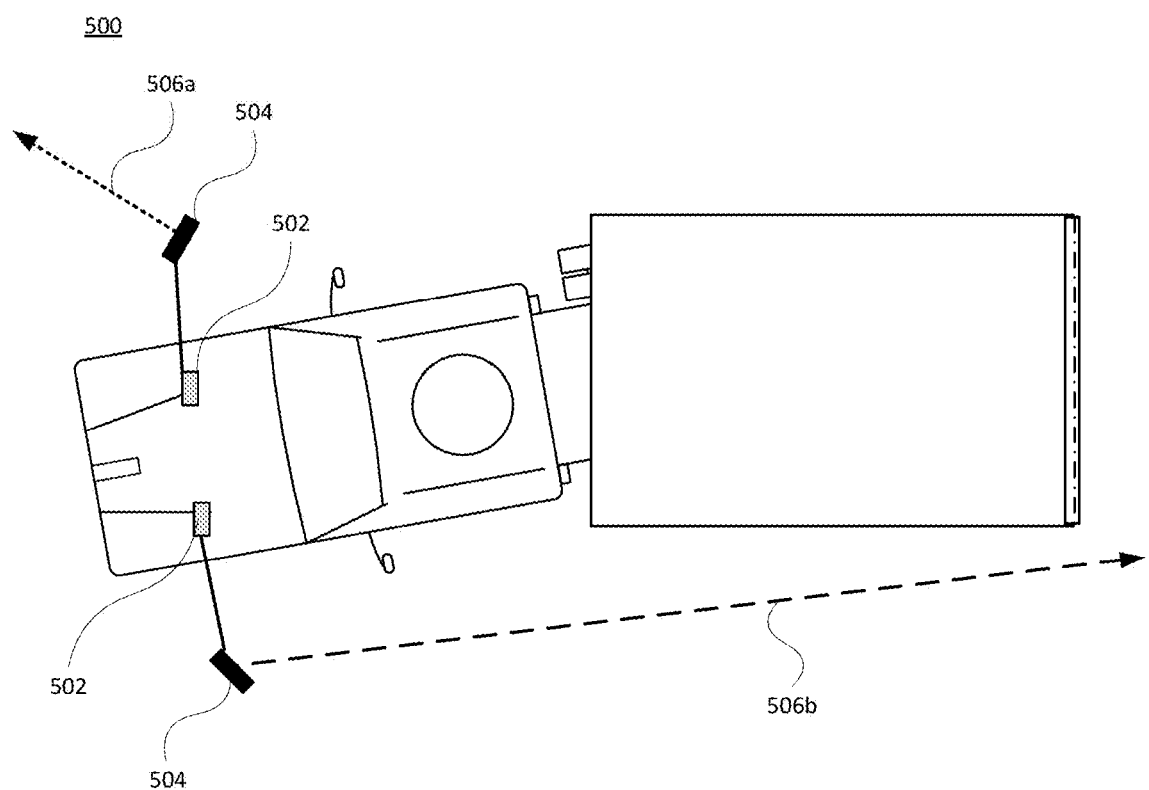
FIGS. 5A-B illustrate a first extension example in accordance with aspects of the technology.
Figure 5B:
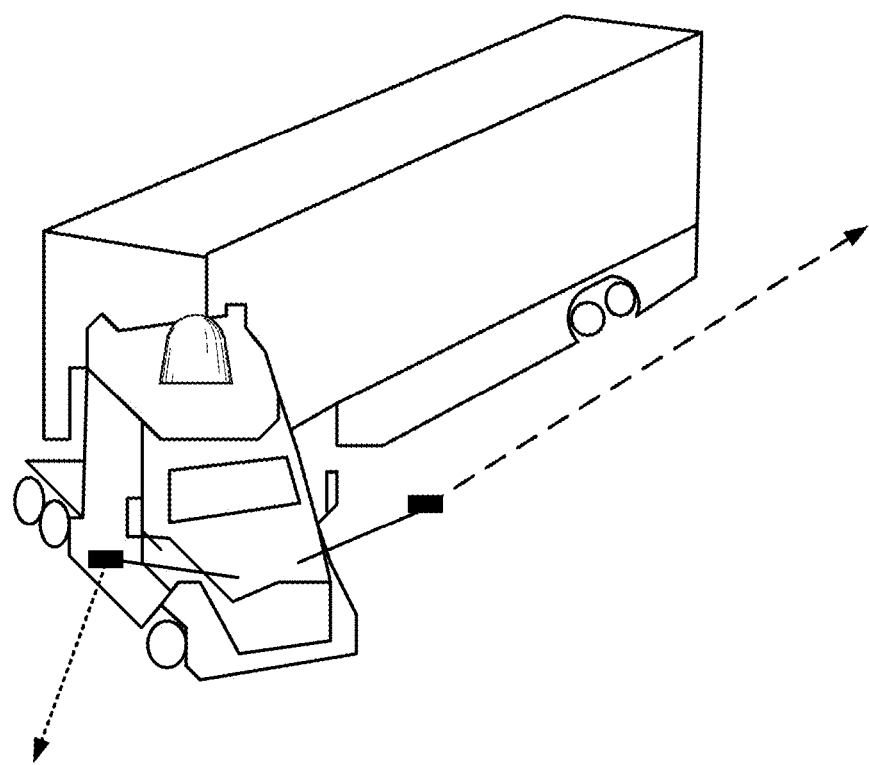
Figure 6B:
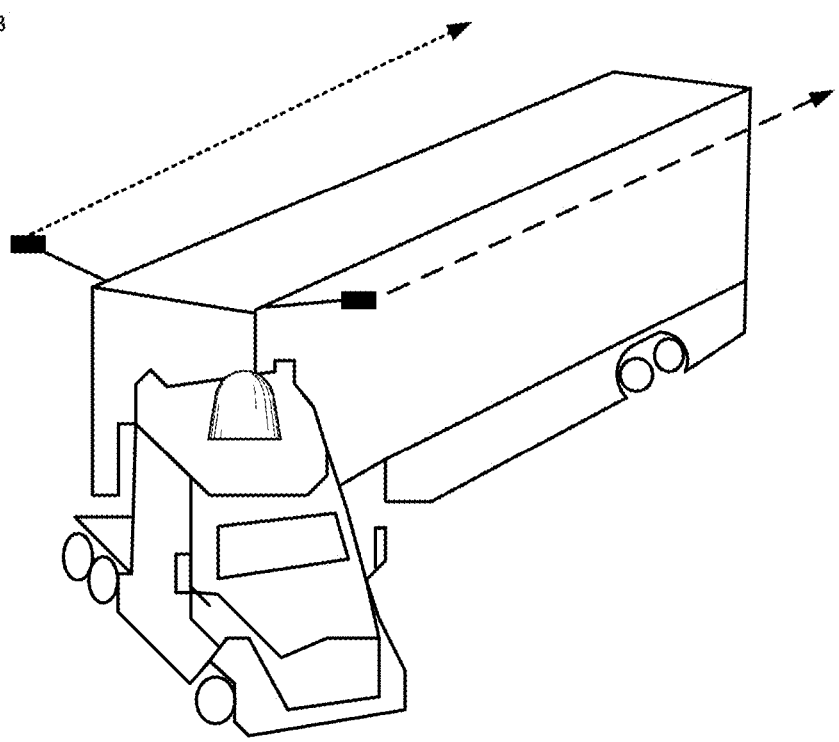
Figure 7A:
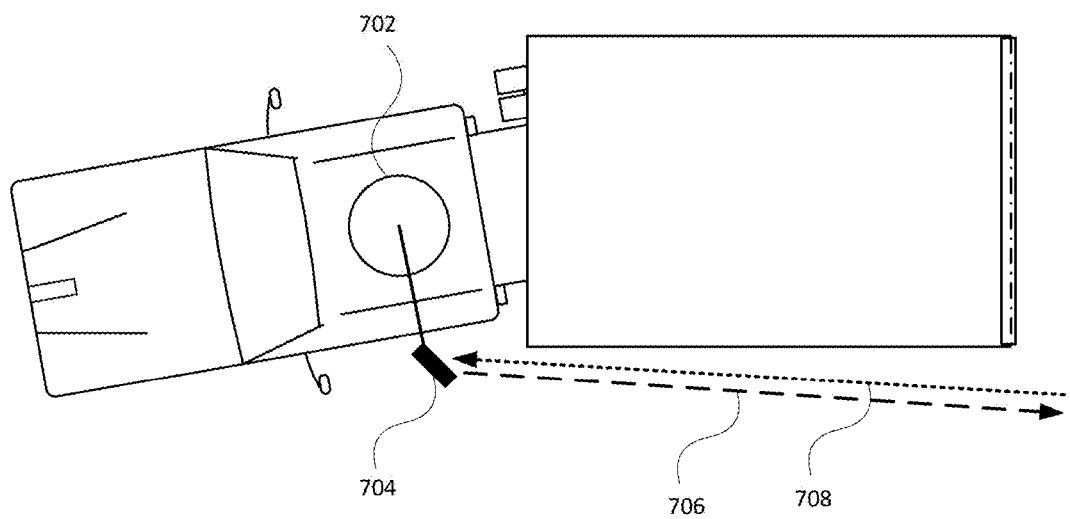
FIGS. 7A-B illustrate a third extension example in accordance with aspects of the technology.
Figure 7B:
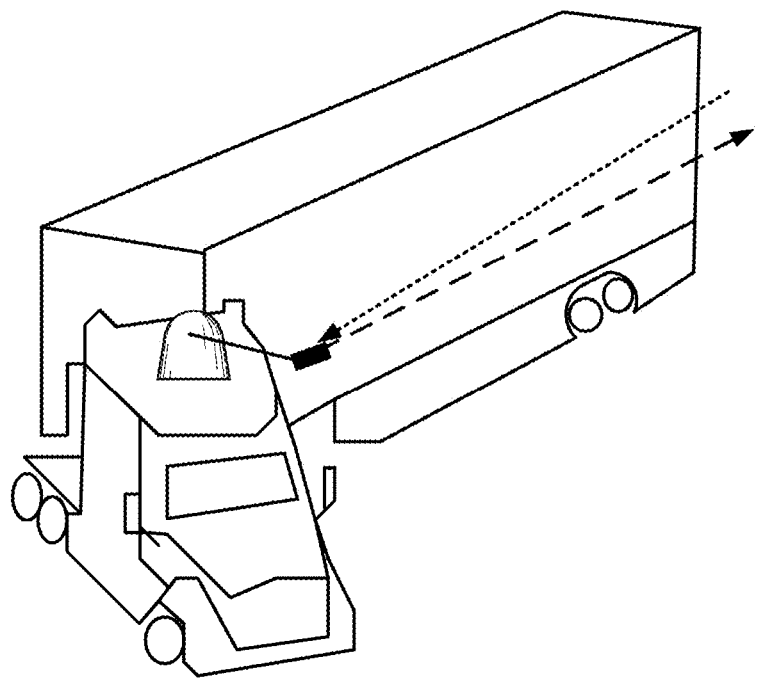

In one example 500 as shown in FIGS. 5A and 5B, one or more sensors 504 may extend from the truck cab, e.g., from aerodynamic covers 502. In this example, each sensor 504 may be extended a selected distance and oriented in a given direction, for instance to emit lidar pulses 506a and 506b in different directions. And in another example 600 as shown in FIGS. 6A and 6B, one or more sensors 604 may extend from the truck trailer, e.g., from aerodynamic covers 602. Similar to example 500, here each sensor 604 may be extended a selected distance and oriented in a given direction, for instance to emit lidar pulses 606a and 606b in different directions. FIGS. 7A-B illustrate yet another example 700. In this case, a sensor 704 extends from a sensor housing 702. Here, the sensor housing 702 protrudes from the roof of the cab (see FIG. 7B), although it may be mounted on another portion of the cab or the trailer. The sensor 704 may emit a lidar or radar signal, as shown by dashed line 706, and receive a return signal as shown by dotted line 708.

As shown in these examples, selective use of each extended sensor allows the vehicle to obtain an enhanced overall FOV from its sensors on an as-needed basis. For instance, when driving in an autonomous mode the vehicle may determine situations when an enhanced FOV is necessary or beneficial. In one scenario, when driving along a freeway or surface street, a cargo truck 802 may detect no approaching vehicles or vehicles ahead of it, as shown in view 800 of FIG. 8A. Here, the vehicle may determine there is no need to extend a currently retracted sensor because a FOV 804 of another sensor is sufficient. However, when the truck detects a vehicle or other object ahead of it, the on-board control system may determine that an enhanced FOV would be beneficial.

Figure 8B:
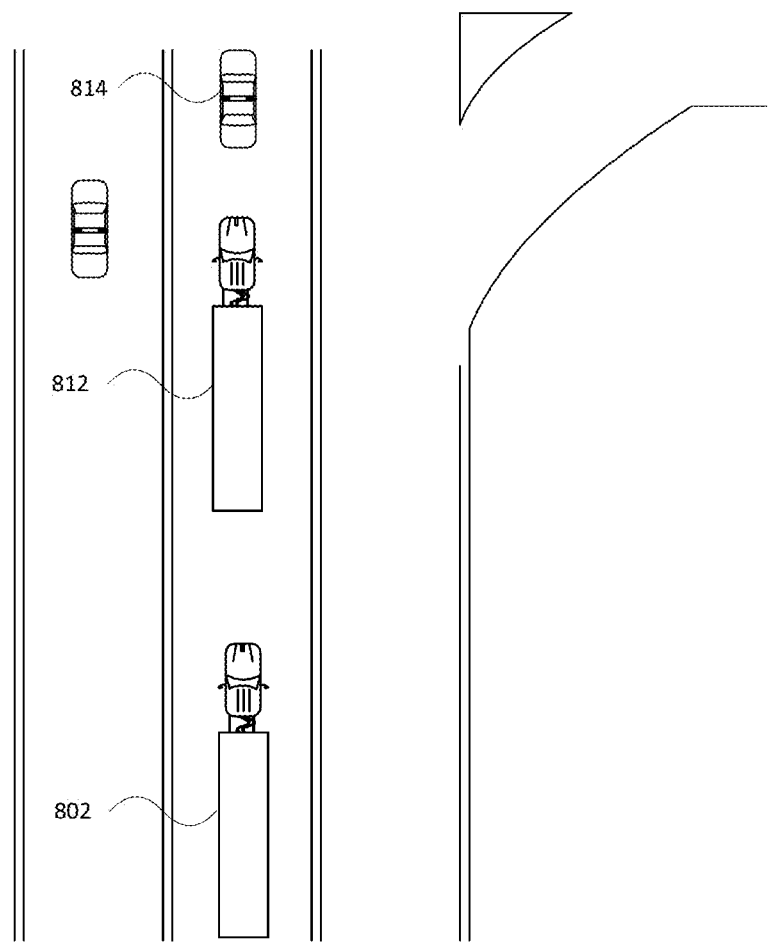

In particular, view 810 of FIG. 8B shows that the truck 802 is now sharing the road with other vehicles, including another truck 812 and a passenger vehicle 814. Here, the other truck 812 is between the truck 802 and the passenger vehicle 814. As shown in view 820 of FIG. 8C, the passenger vehicle 814 is in a blind spot or occlusion zone 822 of FOV 804. The control system of truck 802 may determine or estimate a likelihood that there is another object ahead of it on the roadway, but that it is occluded by the detected truck 812. The control system may cause one or more sensors to extend away from the vehicle and use received sensor information when making driving and/or planning decisions. Deployment can be performed using a motor, servo or other actuator to extend the one or more sensors. By way of example, a sensor assembly including one or more sensors in a housing is affixed to a pole, rod or other extension arm. The extension arm may be a single straight or angled component, or may comprise a plurality of arms coupled via one or more joints. The actuator may employ a stepper motor in conjunction with a worm gear mechanism to extend and retract the extension arm. In one example, the extension arm is configured to provide power, a data/communication link and/or cooling/heating to the sensor assembly. A shock absorber or dampening coupling, such as a rubber coupling, may be used with the motor and/or gear to reduce vibration upon deployment of the sensor assembly. Alternatively, active dampening may be employed by the onboard computing system, for instance in conjunction with the calibration system and sensors such as an accelerometer or gyroscope. The extension of the sensor assembly can be laterally (e.g., to the side of the vehicle), longitudinally (e.g., toward the front or back of the vehicle) and/or vertically (e.g., above or below the roof, chassis or other portion of the vehicle). Thus, as shown in view 830 of FIG. 8D, one or more sensors 832 may be deployed. Here, a pair of sensors 832a and 832b are shown. Upon deployment, each sensor 832a and 832b has its own respective FOV 834a and 834b. It can be seen that at least FOV 834b is able to detect the passenger vehicle ahead of the other truck. In this illustration, FOV 804 of the other sensor is omitted for clarity.

There are other situations where moving the sensors can help unblock the vehicle's FOV. For instance, FIG. 8E illustrates one example 840 with a vehicle of interest 842 at an intersection. Other vehicles 844 and 846 may be in the roadway at or near different parts of the intersection. Here, the vehicle 842 may have a side FOV 848 from one or more sensors. However, as shown vehicle 846 may block FOV 848, creating an obstructed region 849 so that the vehicle 844 is not detected by the sensors of vehicle 842. In this example, the vehicle 846 may be another vehicle turning or moving along the roadway, a construction vehicle that is, e.g., parked along a corner of the intersection, etc.

FIG. 8F illustrates another example 850 with a vehicle of interest 852 at an intersection. Another vehicle 854 may be in the roadway at or near another part of the intersection. Here, a tree, vehicle, construction equipment, scaffolding or other stationary object 856 may be located at a corner of the intersection. In this example, the vehicle 852 may have a side FOV 858 from one or more sensors. However, as shown stationary object 856 may block FOV 858, creating an obstructed region 859 so that the vehicle 854 is not detected by the sensors of vehicle 852.

In many scenarios, the most useful times to retract sensors and be more aerodynamic is when the vehicle is traveling at high speeds (e.g., on freeways) and is traveling long distances for long periods of time. It is also likely that during these types of cruise periods, the vehicle could handle any reduced visibility to the sides and rear because it would be staying in its own lane. When moving around in more busy areas such as surface streets and depots, warehouses or service facilities, is it not as important to be aerodynamically efficient. Thus, in these situations the sensors could be extended outwards for better visibility.

According to one aspect, the extendable sensors may have two locations to which the sensors could be moved. For instance, in a dual-location scenario, one location would be the retracted position and one would be the extended position. Calibration information for both of these locations are known ahead of time, e.g., by calibration system 234 of FIG. 2A. Thus, when the vehicle moves the sensor(s), the onboard control system can confirm that the sensor indeed moves to that location. A perception sensor may also be moved along a linear or rotary track. In this case, the extrinsic calibrations could be calculated in real time based on another sensor that determines the exact position at any given time of the perception sensor.

Figure 9B:
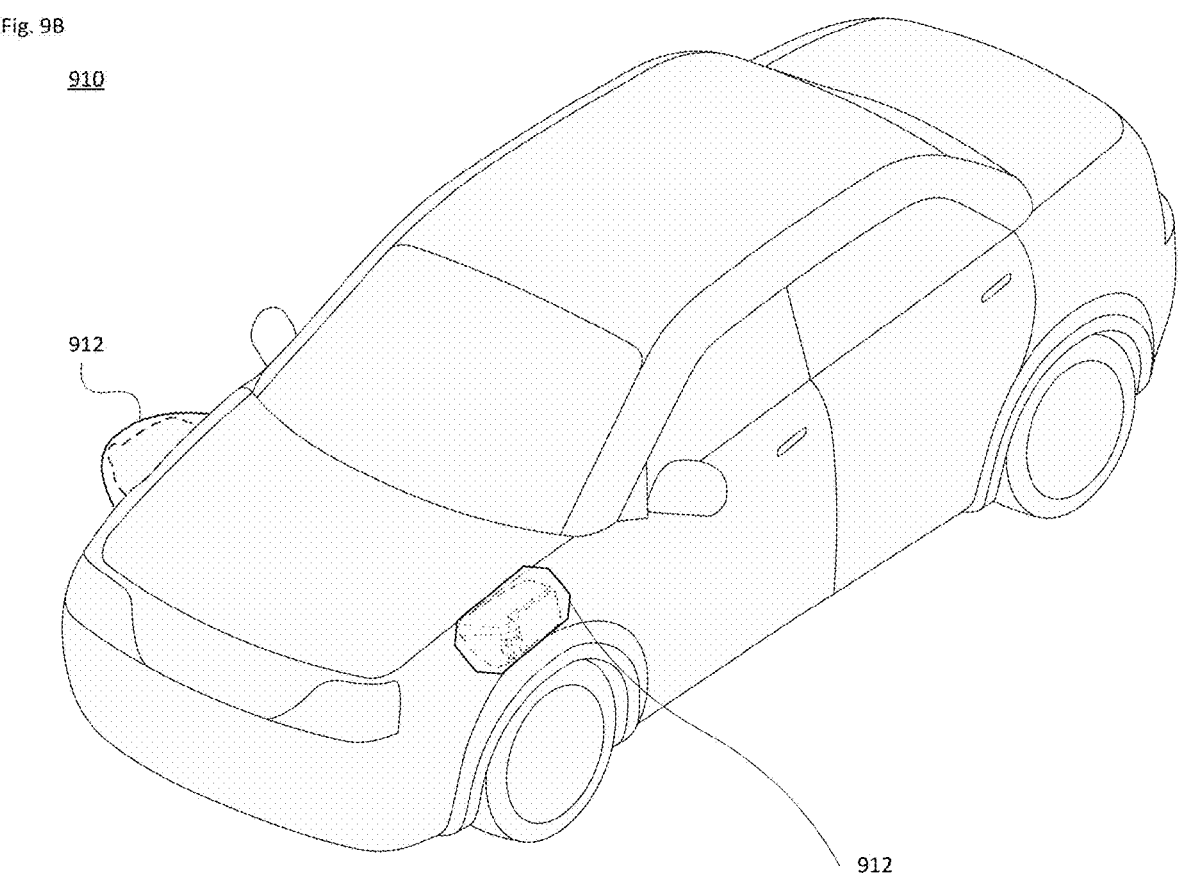

According to another aspect, sensors that normally protrude from the vehicle may desirably be protected in certain situations. FIG. 9A illustrates one example 900, in which sensors 902 are uncovered. In the uncovered state, the sensors are configured to operate as desired, e.g., to detect other objects in the environment around the vehicle. FIG. 9B illustrates another example 910, in which housings 912 cover the sensors. For instance, environmental conditions such as detected or forecast dust storms, hail or heavy rain, or debris from a gravel or dirt road, may caution in favor of protecting one or more sensors with an extendible or rotatable cover. The sensors may also be protected by such a cover for security purposes, such as when parked overnight in a public parking lot or depot (or parked for at least X minutes or Y hours). Other situations where it is helpful to protect a sensor is when the road is of poor quality, e.g., has potholes or is unpaved, and is thus bumpy or otherwise uneven. Here, the system may determine that it is likely that the sensor will vibrate so much as to render the obtained sensor data useless or otherwise below some predetermined quality threshold. In such situations, the perception system can retract a sensor into a position where vibration of the sensor is reduced or eliminated. This may also reduce the need to recalibrate the sensor. In some operational domains, various sensors may be less useful or otherwise less relevant to the task(s) at hand, and can thus be retracted or covered and protected during that time. This allows the sensor to be later deployed when the vehicle is in an operational domain where the sensor is required or otherwise determined to be useful.

The cover itself should be rugged and damage resistant. For instance, it may comprise one or more pieces or layers of metal, carbon fiber, plastic or the like. According to one aspect, the cover may be hydrophobic (or treated with a hydrophobic coating) to protect against rain, sprinklers, fog, or other situations where moisture might otherwise accumulate on the cover. In one example, the cover is a unitary protective layer that slides or rotates over the sensor to protect it. One or more motors and/or gear assemblies may be used to actuate the sliding or rotation. The cover itself could be a transparent material. In addition or alternatively, the cover could be configured to spin, e.g., using one or more rotating gears, so as to throw water, debris or other particulates off via centrifugal force.

According to a further aspects of the technology, while fairings may be used to enhance aerodynamics and fuel economy of a large vehicle such as a cargo truck, they can potentially interfere with sensor data collection. For instance, fairings along the back of the trailer may, when deployed, prevent sensors from detecting objects behind and to the sides of the truck. Thus, to minimize such issues, the onboard control system may actively control deployment of fairings based on certain objectives, such as drag and its impact on truck performance, projected delivery time, route planning, FOV for a current driving situation, etc.

Figure 10A:
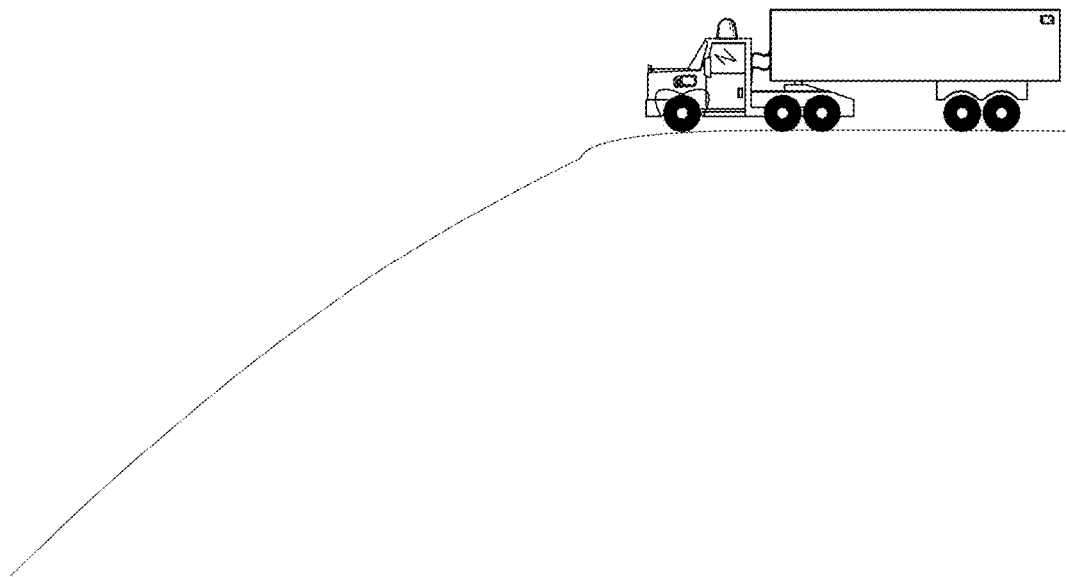
FIGS. 10A-B illustrate a large vehicle braking scenario in accordance with aspects of the disclosure.
Figure 10B:
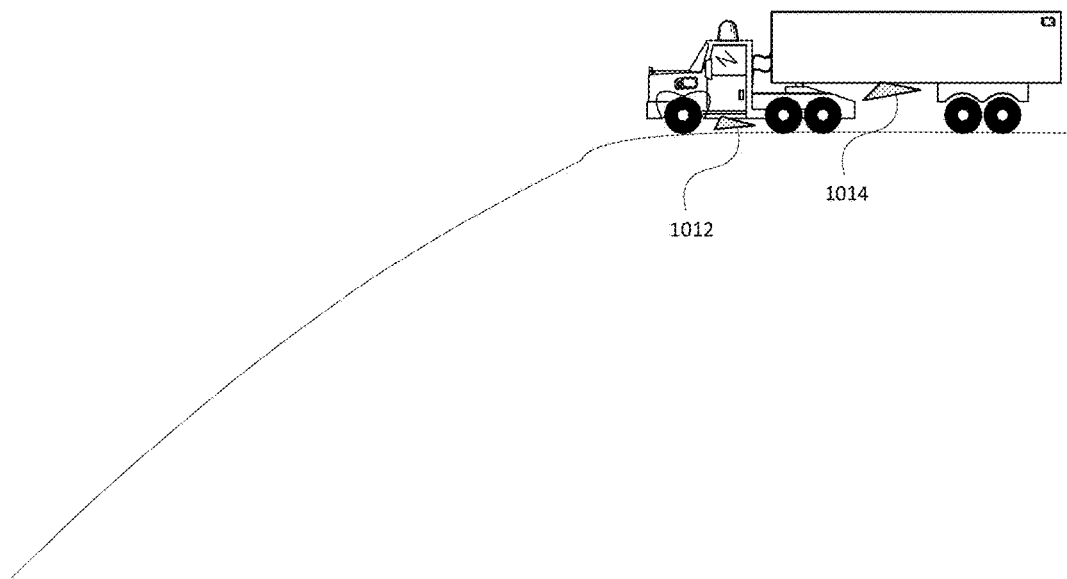

Alternatively or in addition to this, one or more deployable foils can be used in a truck braking assist operation, for instance when the truck is going downhill. FIGS. 10A-B illustrate one scenario. Deployment of the foil(s) can be performed using a motor, servo or other actuator. By way of example, the foil may be coupled to one or arm members. The arm members may be straight or angled components, or may comprise a plurality of articulating arms coupled via one or more joints. The actuator may employ a stepper motor in conjunction with a worm gear mechanism to extend and retract the arm members, and optionally to angle the foil(s) in a particular orientation relative to the vehicle's chassis or road surface. A shock absorber or dampening coupling may be used with the motor and/or gear to reduce vibration upon deployment of the foil(s). Alternatively, active dampening may be employed by the onboard computing system, for instance in conjunction with the calibration system and sensors such as an accelerometer or gyroscope. As shown in view 1000 of FIG. 10A, the truck is at the top of a hill with a steep grade. Before heading down the hill, as shown in view 1010 of FIG. 10B, one or more foils, such as foils 1012 and 1014, may be deployed. Here, the deployable foil(s) can be used to increase the downward force on the truck to slow it down. By way of example, an inverted foil shape can extend from under the vehicle, such as beneath the cab (foil 1012) and/or the trailer (foil 1014). In one scenario, the size and shape of the foils can be selected for a given large vehicle depending on the route(s) the vehicle is likely to take.

Figure 11:
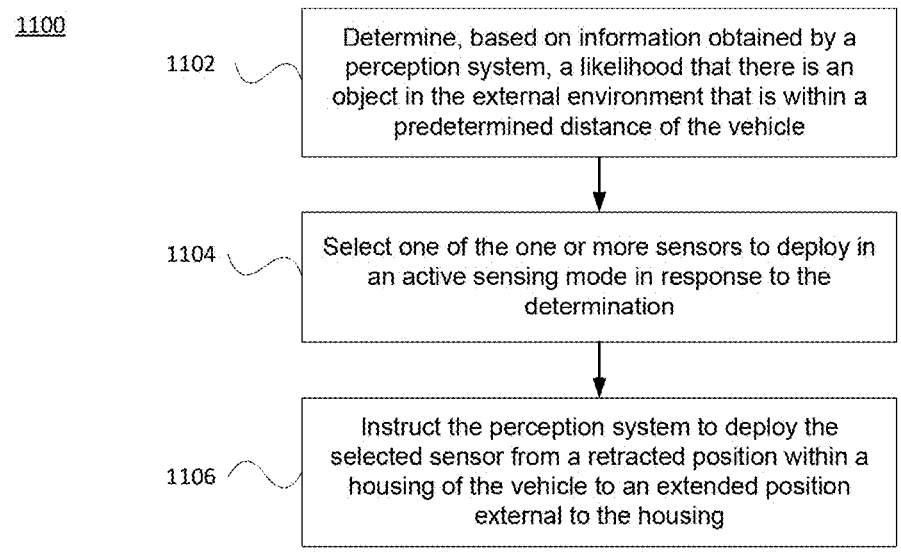
FIG. 11 illustrates a method in accordance with aspects of the disclosure.

FIG. 11 illustrates an example operational method 1100 for a vehicle configured to operate in an autonomous driving mode according to the above techniques. In particular, per block 1102, a control system of the vehicle is configured to determine, based on information obtained by the vehicle's perception system, a likelihood that there is an object in the external environment that is within a predetermined distance of the vehicle. At block 1104, in response to a determination that the likelihood that the object is within the predetermined distance, the control system is configured to select one of the one or more sensors to be deployed in an active sensing mode. And at block 1106, the control system is configured to instruct the perception system to deploy the selected sensor from a retracted position within a housing of the vehicle to an extended position external to the housing.

Figure 12:
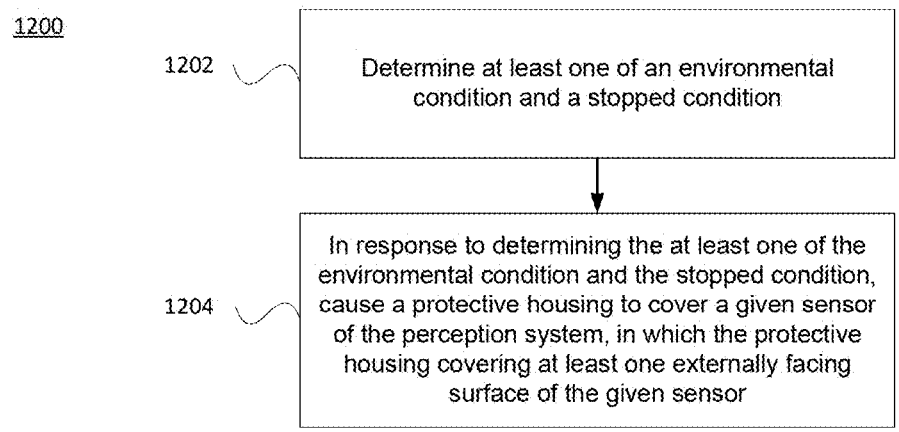
FIG. 12 illustrates a method in accordance with aspects of the disclosure.

FIG. 12 illustrates an example operational method 1200 for a vehicle configured to operate in an autonomous driving mode according to the above techniques. Per block 1202, a control system of the vehicle is configured to determine at least one of an environmental condition and a stopped condition associated with the vehicle while operating in an autonomous driving mode. And per block 1204, in response to determining the at least one of the environmental condition and the stopped condition, the control system is configured to cause a protective housing to cover a given sensor of the perception system. The protective housing is thus arranged to cover at least one externally facing surface of the given sensor.

Figure 13:
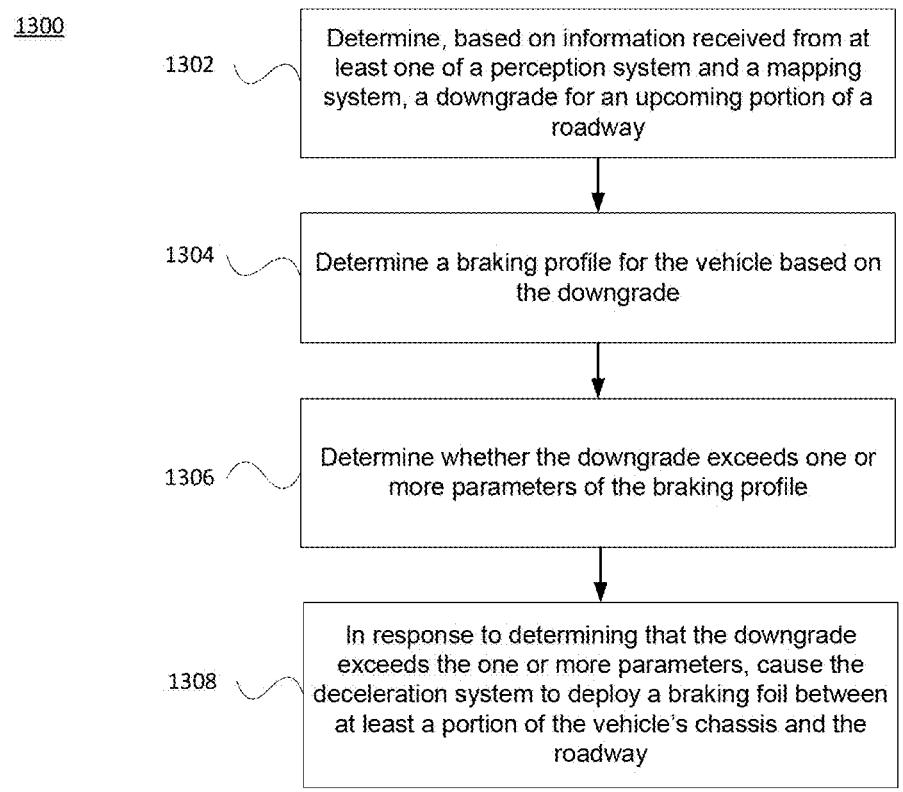
FIG. 13 illustrates a method in accordance with aspects of the disclosure.

And FIG. 13 illustrates an example operational method 1300 for a vehicle configured to operate in an autonomous driving mode according to the above techniques. At block 1302, the control system of the vehicle is configured to determine, based on information received from at least one of the perception system of the vehicle and a mapping system, a downgrade for an upcoming portion of a roadway. At block 1304, the control system is configured to determine a braking profile for the vehicle based on the downgrade. At block 1306, the control system is configured to determine whether the downgrade exceeds one or more parameters of the braking profile. And, per block 1308, in response to determining that the downgrade exceeds the one or more parameters, the control system is configured to cause a deceleration system of the vehicle to deploy a braking foil between at least a portion of the vehicle's chassis and the roadway.

The above approaches enable the onboard computer system to evaluate current and expected conditions while driving in an autonomous mode. The computer system is able to selectively deploy and retract sensors as needed to enhance the overall FOV and reduce blind spots around the vehicle. Such information can be used by the computer system to effectively control the vehicle (e.g., via a planner module of the computer system), for instance by modifying a driving operation, changing a route, or taking other corrective action. The computer system is also able to protect sensors with rugged housings that can prevent damage to the sensors and reduce the need to recalibrate them. Furthermore, the onboard computer system may use other extendable equipment, such as deployable foils, to provide enhanced braking.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

The invention claimed is:

1. A vehicle configured to operate in an autonomous driving mode, the vehicle comprising:
   a driving system including a steering subsystem, an acceleration subsystem and a deceleration subsystem to control driving of the vehicle in the autonomous driving mode;
   a perception system configured to detect objects in an environment external to the vehicle, the perception system including a plurality of sensors; and
   a control system including one or more processors, the control system operatively coupled to the driving system and the perception system, the control system being configured, while the vehicle is operating in the autonomous driving mode, to:
   evaluate an aerodynamic profile of the vehicle to determine impact of deployment of the plurality of sensors on the aerodynamic profile;
   based on the evaluation, select one of the plurality of sensors to be deployed in an active sensing mode; and
   instruct the perception system to deploy the selected sensor from a retracted position along or within the vehicle to an extended position external to the vehicle for operation in the active sensing mode.

2. The vehicle of claim 1, wherein the vehicle includes a cover for protecting the selected sensor in the retracted position.

3. The vehicle of claim 2, wherein the cover defines a portion of a body of the vehicle.

4. The vehicle of claim 2, wherein the cover is aerodynamic.

5. The vehicle of claim 1, wherein the vehicle is a truck and the selected sensor is configured to extend from a cab of the truck.

6. The vehicle of claim 1, wherein the vehicle is a truck and the selected sensor is configured to extend from a trailer of the truck.

7. The vehicle of claim 1, wherein the selected sensor is configured to extend from a sensor housing on a roof of a cab of the vehicle.

8. The vehicle of claim 1, wherein the vehicle is an articulated vehicle, and the selected sensor is configured to extend from an articulating section of the vehicle.

9. The vehicle of claim 1, wherein the selected sensor is configured to extend a selected distance and orientation in a given direction.

10. The vehicle of claim 1, wherein the impact of deployment is determined based on whether the vehicle is traveling above a particular speed.

11. The vehicle of claim 1, wherein the impact of deployment is determined based on an amount of time the vehicle has been traveling.

12. The vehicle of claim 1, wherein the impact of deployment is determined based on a type of roadway on which the vehicle is operating in the autonomous driving mode.

13. The vehicle of claim 1, wherein the impact of deployment is determined based on whether the vehicle is operating in a particular lane of a roadway.

14. The vehicle of claim 1, wherein:
   the control system is further configured to determine, based on information obtained by the perception system, a likelihood that there is an occluded object in the external environment that is within a predetermined distance of the vehicle; and
   selection of the sensor to be deployed in an active sensing mode is further based on the likelihood that there is an occluded object in the external environment that is within the predetermined distance of the vehicle.

15. A method of operating a vehicle in an autonomous driving mode, the method comprising:
   evaluating, by one or more processors of the vehicle operating in the autonomous driving mode, an aerodynamic profile of the vehicle to determine impact of deployment of a plurality of sensors of a perception system of the vehicle on the aerodynamic profile;
   based on the evaluation, selecting, by the one or more processors, one of the plurality of sensors to be deployed in an active sensing mode; and
   instructing, by the one or more processors, the perception system to deploy the selected sensor from a retracted position along or within the vehicle to an extended position external to the vehicle for operation in the active sensing mode.

16. The method of claim 15, wherein the impact of deployment is determined based on a type of roadway on which the vehicle is operating in the autonomous driving mode.

17. The method of claim 15, wherein the impact of deployment is determined based on whether the vehicle is operating in a particular lane of a roadway.

18. The method of claim 15, further comprising:
   determining, based on information obtained by the perception system, a likelihood that there is an occluded object in the external environment that is within a predetermined distance of the vehicle; and selecting the sensor to be deployed in an active sensing mode is further based on the likelihood that there is an occluded object in the external environment that is within the predetermined distance of the vehicle.

19. The method of claim 15, wherein the impact of deployment is determined based on whether the vehicle is traveling above a particular speed.

20. The method of claim 15, wherein the impact of deployment is determined based on an amount of time the vehicle has been traveling.

* * * * *